(12) United States Patent
Brookmire et al.

(10) Patent No.: US 11,962,884 B2
(45) Date of Patent: Apr. 16, 2024

(54) DIGITAL IMAGE CAPTURING DEVICES INCLUDING LENS MODULES WITH DUAL ACTIVELY-ALIGNED INTEGRATED SENSOR-LENS ASSEMBLIES

(71) Applicant: GoPro, Inc., San Mateo, CA (US)

(72) Inventors: Michael Brookmire, Half Moon Bay, CA (US); Ingrid A. Cotoros, Hillsborough, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 335 days.

(21) Appl. No.: 17/420,778

(22) PCT Filed: Jan. 2, 2020

(86) PCT No.: PCT/US2020/012022
§ 371 (c)(1),
(2) Date: Jul. 6, 2021

(87) PCT Pub. No.: WO2020/142586
PCT Pub. Date: Jul. 9, 2020

(65) Prior Publication Data
US 2022/0124230 A1    Apr. 21, 2022

Related U.S. Application Data

(60) Provisional application No. 62/788,433, filed on Jan. 4, 2019.

(51) Int. Cl.
*H04N 23/55* (2023.01)
*G02B 7/00* (2021.01)

(52) U.S. Cl.
CPC ............ *H04N 23/55* (2023.01); *G02B 7/005* (2013.01)

(58) Field of Classification Search
CPC ........ H04N 23/55; G02B 7/005; G02B 7/003; G03B 37/04
See application file for complete search history.

(56) References Cited

U.S. PATENT DOCUMENTS

2017/0111559 A1*    4/2017    Abbas ................ G03B 17/12

FOREIGN PATENT DOCUMENTS

| CN | 106249515 A | * 12/2016 | ............ G03B 17/12 |
| CN | 206353235 U |   7/2017  | |

OTHER PUBLICATIONS

International Search Report and Written Opinion issued in PCT/US2020/012022 dated Jun. 29, 2020, 18 pages.

(Continued)

*Primary Examiner* — Ahmed A Berhan
(74) *Attorney, Agent, or Firm* — Young Basile Hanlon & MacFarlane, P.C.

(57) ABSTRACT

In one aspect of the present disclosure, a digital image capturing device (DICD) is described that includes a first integrated sensor-lens assembly (ISLA) defining a first optical axis and facing in a first direction; a second ISLA defining a second optical axis offset from the first optical axis and facing in a second direction generally opposite the first direction (i.e., such that the second ISLA is rotated approximately 180 from the first ISLA); and a bridge member that is positioned between the first and second ISLAs to fixedly secure together the first and second ISLAs. The bridge member is configured as a discrete structure (i.e., as being separate from both the first ISLA and the second ISLA), and defines a longitudinal axis that is generally parallel in relation to the first and second optical axes.

20 Claims, 17 Drawing Sheets

(56) References Cited

OTHER PUBLICATIONS

International Preliminary Report on Patentability for App. No. PCT/US2020/012022, dated Jun. 16, 2021, 10 pages.

* cited by examiner

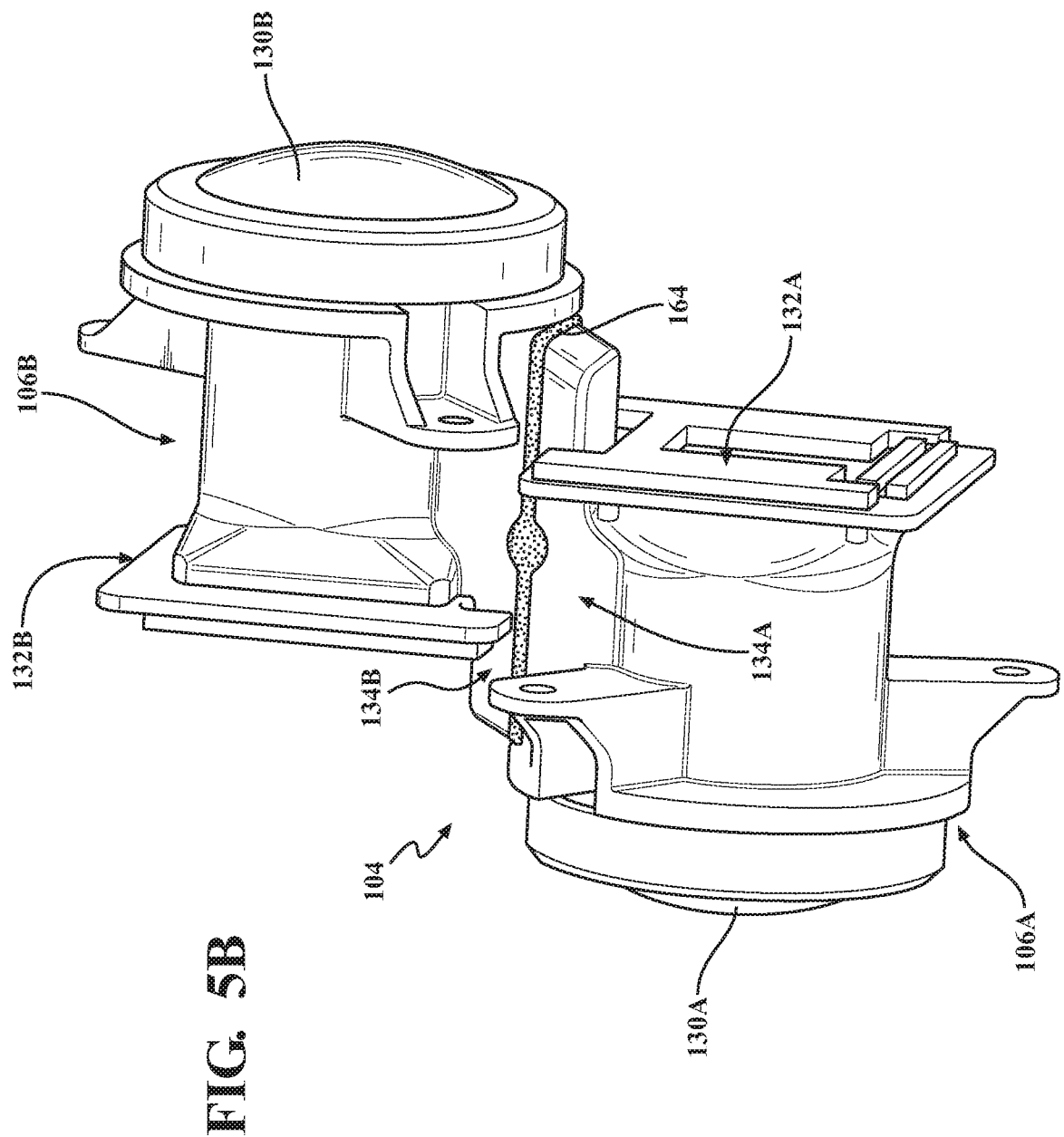

DIGITAL IMAGE CAPTURING DEVICES INCLUDING LENS MODULES WITH DUAL ACTIVELY-ALIGNED INTEGRATED SENSOR-LENS ASSEMBLIES

CROSS-REFERENCE TO RELATED APPLICATIONS

This application is a 371 of International Application No. PCT/US2020/012022, filed on Jan. 2, 2020, which claims priority to U.S. Provisional Application No. 62/788,433, filed on Jan. 4, 2019, the entire contents of each application being hereby incorporated by reference.

TECHNICAL FIELD

The present disclosure relates generally to digital image capturing devices (DICDs), and, more specifically, to DICDs including dual integrated sensor-lens assemblies (ISLAs).

BACKGROUND

DICDs, such as digital cameras, are used in various applications, including, for example, handheld cameras and video recorders, drones, and vehicles. DICDs capture, focus, and convert light into an electronic image signal using an optical module that typically includes one or more lenses and image sensors. To produce a high-quality, focused image, however, each lens must be properly aligned with a corresponding image sensor in multiple degrees-of-freedom. Even small misalignments (e.g., in position or tilt of the lens and/or the image sensor) can negatively impact the image generated by the DICD.

To address this concern, active alignment procedures have been developed that continually measure and adjust the positions of the lens and/or the image sensor during assembly of the optical module to optimize alignment. The present disclosure discusses various advancements in active alignment technology as it relates to spherical DICDs including multiple lenses and multiple image sensors.

SUMMARY

In one aspect of the disclosure, an optical module for a digital image capturing device (DICD) is described. The optical module includes a first integrated sensor-lens assembly (ISLA), a second ISLA, and a bridge member configured as a discrete structure (i.e., as being separate from both the first ISLA and the second ISLA). The first ISLA defines a first optical axis and includes a first lens; a first image sensor that is fixed in relation to the first lens; and a first mount that is configured to support the first lens and the first image sensor. The second ISLA defines a second optical axis that is offset from the first optical axis and includes a second lens; a second image sensor that is fixed in relation to the second lens; and a second mount that is configured to support the second lens and the second image sensor. The first mount includes a first receptacle and the second mount includes a second receptacle that collectively defines a cavity with the first receptacle. The first and second ISLAs are identical in configuration and are oriented in generally opposite directions (i.e., such that the second ISLA is rotated approximately 180° from the first ISLA), and the bridge member is configured for receipt within the cavity defined by the first and second receptacles to thereby fixedly secure together the first and second ISLAs.

In certain embodiments, the first ISLA may define a first field-of-view of approximately 180° to approximately 210°, and the second ISLA may define a second field-of-view of approximately 180° to approximately 210°. In such embodiments, the first and second ISLAs may be positioned such that the first and second fields-of-view overlap, whereby images captured by the first and second ISLAs can be stitched together to form a single image (e.g., a spherical image). In certain embodiments, the bridge member may include a first bridge portion, and a second bridge portion that is connected to the first bridge portion. In certain embodiments, the first and second bridge portions may be identical in configuration and positioned in generally opposite orientations (i.e., the second bridge portion may be rotated approximately 180° from the first bridge portion). In certain embodiments, the bridge member may define a first node that is located adjacent a first end of the bridge member; a second node that is located adjacent a second, opposite end of the bridge member; and a third node that is positioned between the first and second nodes. In certain embodiments, the cavity defined by the first and second receptacles may include a first cavity portion that is configured to receive the first node of the bridge member; a second cavity portion that is configured to receive the second node of the bridge member; and a third cavity portion that is configured to receive the third node of the bridge member. In certain embodiments, the first and second receptacles may each define a first end chamber, a second end chamber, and an intermediate chamber that is positioned between the first and second end chambers. In certain embodiments, the first end chamber of the first receptacle may be positioned generally opposite the second end chamber of the second receptacle so as to define the first cavity portion, the second end chamber of the first receptacle may be positioned generally opposite the first end chamber of the second receptacle so as to define the second cavity portion, and the intermediate chamber of the first receptacle may be positioned generally opposite the intermediate chamber of the second receptacle so as to define the third cavity portion. It is envisioned that the optical module described above may include any combination of the features and the elements described in this paragraph.

In another aspect of the present disclosure, a digital image capturing device (DICD) is described that includes a first integrated sensor-lens assembly (ISLA) defining a first optical axis and facing in a first direction; a second ISLA defining a second optical axis offset from the first optical axis and facing in a second direction generally opposite the first direction (i.e., such that the second ISLA is rotated approximately 180° from the first ISLA); and a bridge member that is positioned between the first and second ISLAs to fixedly secure together the first and second ISLAs. The bridge member is configured as a discrete structure (i.e., as being separate from both the first ISLA and the second ISLA), and defines a longitudinal axis that is generally parallel in relation to the first and second optical axes.

In certain embodiments, the first and second ISLAs may be identical in configuration. In certain embodiments, the first ISLA may define a first field-of-view of approximately 180° to approximately 210°, and the second ISLA may define a second field-of-view of approximately 180° to approximately 210°. In such embodiments, the first and second ISLAs may be positioned such that the first and second fields-of-view overlap, whereby images captured by the first and second ISLAs can be stitched together to form a single image (e.g., a spherical image). In certain embodiments, the first ISLA may include a first lens; a first image sensor fixed in relation to the first lens; and a first mount that is configured to support the first lens and the first image sensor. Correspondingly, the second ISLA may include a second lens; a second image sensor fixed in relation to the second lens; and a second mount that is configured to support the second lens and the second image sensor. In certain embodiments, the first mount may define a first receptacle, and the second mount may define a second receptacle, wherein the first and second receptacles are each configured to receive the bridge member to thereby connect the first ISLA and the second ISLA. In certain embodiments, the DICD may further include a curable adherent (e.g., an adhesive that is curable via exposure to UV light and/or heat) that is positioned between the bridge member and the first and second mounts to fixedly secure the bridge member to the first and second mounts. In certain embodiments, the bridge member may include a first bridge portion, and a second bridge portion that is connected to the first bridge portion. In certain embodiments, the first and second bridge portions may be identical in configuration and may each include a first end section; an opposite second end section; and an intermediate section positioned between the first and second end sections. The first and second bridge portions may be oriented in generally opposite directions (i.e., the second bridge portion may be rotated approximately 180° from the first bridge portion) such that the first end section of the first bridge portion is positioned adjacent the second end section of the second bridge portion so as to define a first node, the second end section of the first bridge portion is positioned adjacent the first end section of the second bridge portion so as to define a second node, and the intermediate section of the first bridge portion is positioned adjacent the intermediate section of the second bridge portion so as to define a third node that is positioned between the first and second nodes. In certain embodiments, the first and second receptacles may each define a first end chamber; a second end chamber; and an intermediate chamber that is positioned between the first and second end chambers, wherein the chambers of the first receptacle and the chambers of the second receptacle collectively define a cavity that is configured to receive the bridge member. In certain embodiments, the first and second ISLAs may be positioned such that: the first end chamber of the first receptacle is positioned generally opposite the second end chamber of the second receptacle so as to define a first cavity portion that is configured to receive the first node of the bridge member; the second end chamber of the first receptacle may be positioned generally opposite the first end chamber of the second receptacle so as to define a second cavity portion that is configured to receive the second node of the bridge member; and the intermediate chamber of the first receptacle may be positioned generally opposite the intermediate chamber of the second receptacle so as to define a third cavity portion that is configured to receive the third node of the bridge member. It is envisioned that the optical module described above may include any combination of the features and the elements described in this paragraph. It is envisioned that the DICD described above may include any combination of the features and the elements described in this paragraph.

In another aspect of the disclosure, a method is described for assembling an optical module for a digital image capturing device (DICD) that includes first and second identical integrated sensor-lens assemblies (ISLAs). The method includes actively aligning a lens and an image sensor of the first ISLA; actively aligning a lens and an image sensor of the second ISLA; connecting a bridge member to the first ISLA; connecting the second ISLA to the bridge member such that optical axes defined by the first and second ISLAs are offset from one another, and the first and second ISLAs are oriented in generally opposite directions (i.e., such that the first and second ISLAs are rotated approximately 180° from one another); and actively aligning the first and second ISLAs with respect to one another.

In certain embodiments, connecting the bridge member to the first ISLA and connecting the second ISLA to the bridge member may include positioning the bridge member within a cavity collectively defined by the first ISLA and the second ISLA. In certain embodiments, positioning the bridge member within the cavity may include positioning the bridge member within a first receptacle defined by the first ISLA and within a second receptacle defined by the second ISLA. In certain embodiments, the cavity may include: a first cavity portion; a second cavity portion; and a third cavity portion. In such embodiments, positioning the bridge member may include positioning a first node of the bridge member within the first cavity portion, positioning a second node of the bridge member within the second cavity portion, and positioning a third node of the bridge member within the third cavity portion. In certain embodiments, connecting the bridge member to the first ISLA and connecting the second ISLA to the bridge member may include curing an adherent (e.g., an adhesive that is curable via exposure to UV light and/or heat) that is positioned between the bridge member and the receptacles defined by the first and second ISLAs. It is envisioned that the method described above may include any combination of the features and the elements described in this paragraph.

In another aspect of the disclosure, a digital image capturing device (DICD), is disclosed that includes a first integrated sensor-lens assembly (ISLA) facing in a first direction and defining a first optical axis; a second ISLA facing in a second direction generally opposite to the first direction and defining a second optical axis that is offset from the first optical axis; and a bridge member that is positioned between the first ISLA and the second ISLA to fixedly secure together the first ISLA and the second ISLA. The bridge member is configured as a discrete structure that is separate from the first ISLA and the second ISLA and defines a longitudinal axis that is generally parallel in relation to the first optical axis and the second optical axis.

In certain embodiments, the first ISLA may include a first lens; a first image sensor that is fixed in relation to the first lens; and a first mount that is configured to support the first lens and the first image sensor. In certain embodiments, the second ISLA may include a second lens; a second image sensor that is fixed in relation to the second lens; and a second mount that is configured to support the second lens and the second image sensor. In certain embodiment, the first mount may define a first receptacle and the second mount may define a second receptacle. In certain embodiments, the first receptacle and the second receptacle may each be configured to receive the bridge member to thereby connect the first ISLA and the second ISLA. In certain embodiments, the bridge member may include a first bridge portion and a second bridge portion that is connected to the first bridge portion. In certain embodiments, the first bridge portion and the second bridge portion may be identical in configuration and oriented in generally opposite directions. In certain embodiments, the first bridge portion and the second bridge portion may each include a first end section; a second end section opposite to the first end section; and an intermediate section that is positioned between the first end section and the second end section. In certain embodiments, the first end section of the first bridge portion may be positioned adjacent to the second end section of the second bridge portion so as to define a first node, the second end section of the first bridge portion may be positioned adjacent to the first end section of the second bridge portion so as to define a second node, and the intermediate section of the first bridge portion may be positioned adjacent to the intermediate section of the second bridge portion so as to define a third node that is positioned between the first node and the second node. In certain embodiments, the first receptacle and the second receptacle may each define a first end chamber; a second end chamber; and an intermediate chamber that is positioned between the first end chamber and the second end chamber. In certain embodiments, the chambers of the first receptacle and the chambers of the second receptacle may collectively define a cavity that is configured to receive the bridge member. In certain embodiments, the first ISLA and the second ISLA may be positioned such that the first end chamber of the first receptacle is positioned generally opposite to the second end chamber of the second receptacle so as to define a first cavity portion that is configured to receive the first node of the bridge member, the second end chamber of the first receptacle is positioned generally opposite to the first end chamber of the second receptacle so as to define a second cavity portion that is configured to receive the second node of the bridge member, and the intermediate chamber of the first receptacle is positioned generally opposite to the intermediate chamber of the second receptacle so as to define a third cavity portion that is configured to receive the third node of the bridge member. In certain embodiments, the first ISLA and the second ISLA may be identical in configuration. In certain embodiments, the first ISLA may define a first field-of-view of approximately 180° to approximately 210° and the second ISLA may define a second field-of-view of approximately 180° to approximately 210°. In certain embodiments, the first ISLA and the second ISLA may be positioned such that the first field-of-view and the second field-of-view overlap, whereby images captured by the first ISLA and the second ISLA can be stitched together to form a single image. In certain embodiments, the DICD may further include a curable adherent that is positioned between the bridge member, the first ISLA, and the second ISLA to fixedly secure the bridge member to the first ISLA and to the second ISLA. It is envisioned that the DICD described above may include any combination of the features and the elements described in this paragraph.

In another aspect of the present disclosure, a method of assembling an optical module for a digital image capturing device (DICD) including first and second identical integrated sensor-lens assemblies (ISLAs) is disclosed. The method includes actively aligning a lens and an image sensor of the first ISLA; actively aligning a lens and an image sensor of the second ISLA; connecting a bridge member to the first ISLA; connecting the second ISLA to the bridge member such that optical axes defined by the first ISLA and the second ISLA are offset from one another and the first ISLA and the second ISLA are oriented in generally opposite directions; and actively aligning the first ISLA and the second ISLA with respect to one another.

In certain embodiments, connecting the bridge member to the first ISLA and connecting the second ISLA to the bridge member may include positioning the bridge member within a cavity collectively defined by the first ISLA and the second ISLA. In certain embodiments, positioning the bridge member within the cavity may include positioning the bridge member within a first receptacle defined by the first ISLA and within a second receptacle defined by the second ISLA. In certain embodiments, positioning the bridge member within the cavity may include positioning a first node of the bridge member within a first cavity portion; positioning a second node of the bridge member within a second cavity portion; and positioning a third node of the bridge member within a third cavity portion. In certain embodiments, connecting the bridge member to the first ISLA and connecting the second ISLA to the bridge member may include curing an adherent that is positioned between the bridge member, the first ISLA, and the second ISLA. It is envisioned that the method described above may include any combination of the features and the elements described in this paragraph.

BRIEF DESCRIPTION OF THE DRAWINGS

The disclosure is best understood from the following detailed description when read in conjunction with the accompanying drawings. It is emphasized that, according to common practice, the various features of the drawings may not be to scale, and the dimensions of the various components may be arbitrarily expanded or reduced for clarity.

FIG. 5B is a side, perspective view of the optical module upon assembly.

DETAILED DESCRIPTION

Figure 1A:
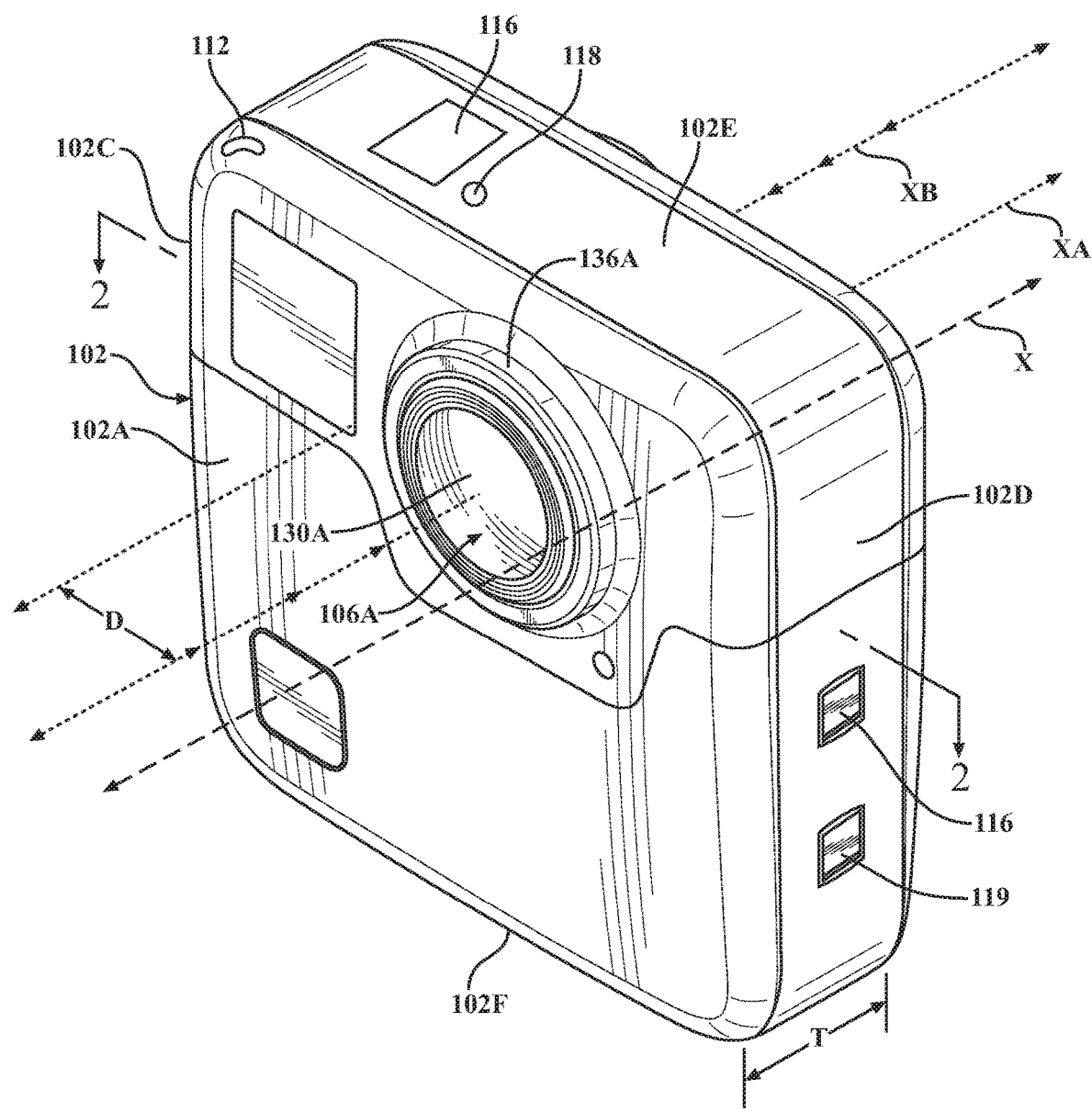
FIG. 1A is a front, perspective view of a DICD including an optical module with identical (first and second) ISLAs oriented in generally opposite directions in accordance with the principles of the present disclosure.

The present disclosure describes a DICD including an optical module with dual (first and second) ISLAs, which may be identical or non-identical in configuration in various embodiments of the disclosure. The ISLAs are oriented in generally opposite directions (i.e., such that the ISLAs are rotated approximately 180° from one another) and include overlapping fields-of-view so as to support the capture and creation of spherical images. The ISLAs are fixedly connected to one another (e.g., by a bridge member), which allows for a reduction in not only the overall number of components in the optical module, but the complexity typically associated with the assembly of spherical DICDs. Many known spherical DICDs, for example, require a high number of mechanical connections and/or interfaces between ISLAs, each of which must be adjusted during the alignment process, often within very small tolerances (e.g., on the order of microns), which results in a lengthy, complex assembly process with a low yield. The structures and methods described herein address this issue by reducing the number of mechanical connections and/or interfaces between the ISLAs via attachment through the aforementioned bridge member.

During assembly of the optical module, the ISLAs are separately subjected to an active alignment process, during which, optimal alignment is achieved between the lens and the image sensor included in each ISLA. Subsequently, the various components of the ISLAs are secured together using UV and thermal curing processes, the components of the optical module (e.g., the ISLAs and the bridge member) are cleaned (e.g., via a plasma cleaning process) to prepare the components for connection, and the individual ISLAs are connected to each other.

To connect the ISLAs, initially, an adherent is applied to the first ISLA and/or the bridge member, and a first apparatus (e.g., a robotic assembly) is used to position and align the bridge member with respect to the first ISLA. Once properly positioned, the adherent is subjected to UV and thermal curing processes to fix the connection between the first ISLA and the bridge member. After allowing the assembly of the first ISLA and the bridge member to cool, adherent is applied to the second ISLA and/or the bridge member, and the assembly of the first ISLA and the bridge member is connected to the second ISLA using a second apparatus (e.g., a robotic assembly), which positions and aligns the bridge member with respect to the second ISLA. The optical module is then subjected to an additional active (bore-sight) alignment process to align the ISLAs with respect to one another. More specifically, while viewing one or more optical targets, the positions of the ISLAs are continually adjusted until optimal alignment is achieved. Once properly aligned, the adherent is subjected to UV and thermal curing processes to fix the relative positions of the ISLAs and the bridge member, and thereby preserve alignment.

With reference now to FIGS. 1A-3, an example DICD 100 is illustrated for use in capturing (and storing) digital data including, for example, images, video, and audio. The DICD 100 includes a body 102, an optical module 104 (FIG. 2) with dual (e.g., first and second) ISLAs 106A, 106B that define respective fields-of-view 108A, 108B, and a bridge member 110 that is positioned between the ISLAs 106A, 106B to fixedly connect the ISLAs 106A, 106B.

Figure 1B:
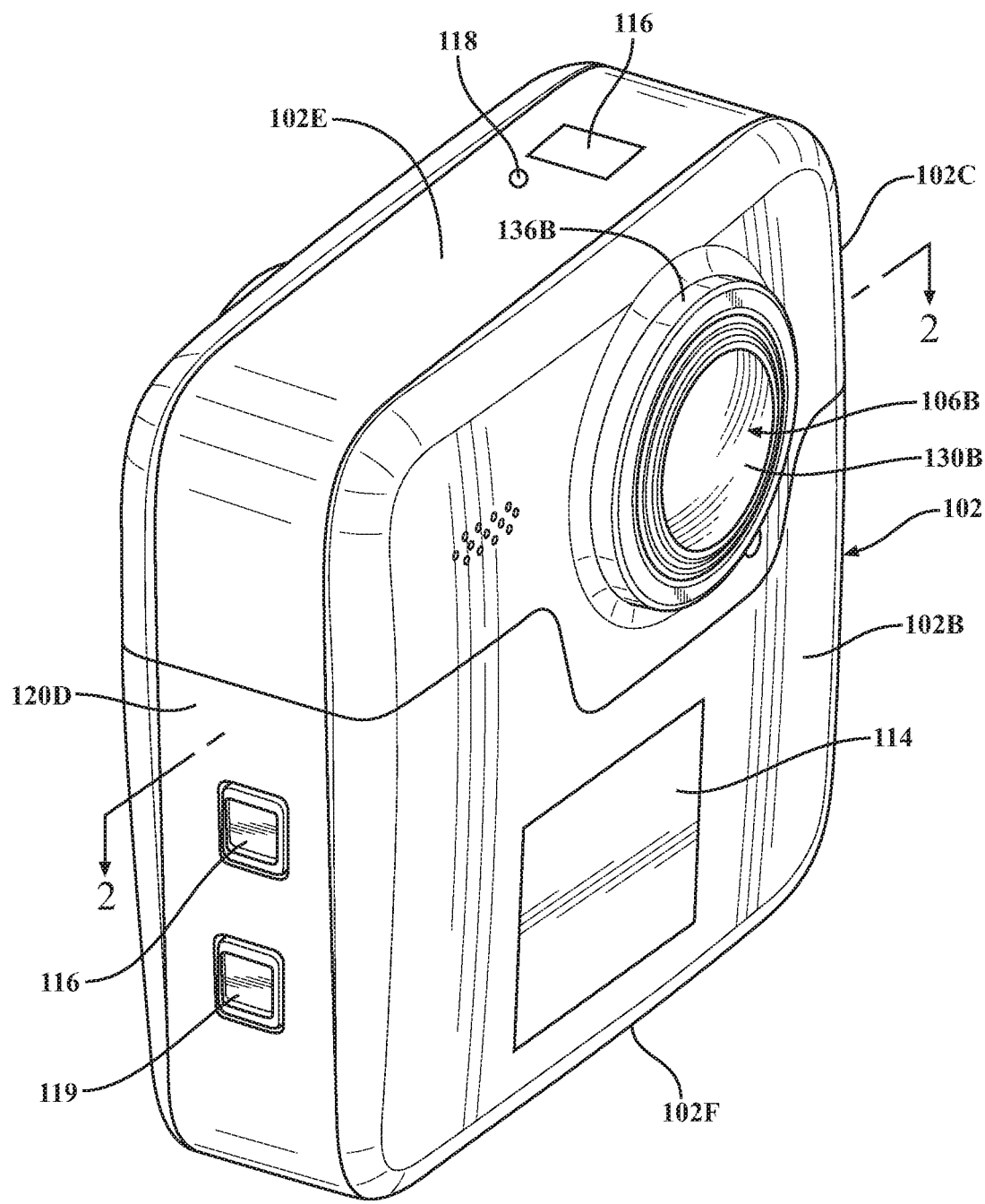
FIG. 1B is a rear, perspective view of the DICD seen in FIG. 1.

The body 102 supports the optical module 104, as well as the various other internal and external components of the DICD 100, and may include (e.g., may be formed from) any material or combination of materials suitable for this intended purpose, such as plastic, aluminum, steel, fiberglass, etc. For example, as seen in FIGS. 1A and 1B, the body 102 includes a variety of indicators, such as one or more LED lights 112 and an LED display 114, as well as one or more buttons 116 that allow a user to interact with the DICD 100 (e.g., to turn the DICD 100 on and off, configure the operating mode, etc.). The body 102 may also support a microphone 118 to allow the DICD 100 to receive and/or record audio signals, an I/O interface 119 (e.g., to transmit to, and receive data from, various external devices), and various other input mechanisms (e.g., switches, touchscreen mechanisms, etc.). Although the body 102 of the DICD 100 is illustrated as including six external surfaces (i.e., a front face 102A, a rear face 102B, a left face 102C, a right face 102D, a top face 102E, and a bottom face 102F) defining a generally rectangular-cuboid configuration, the particular geometric configuration of the body 102 may be varied in alternate embodiments without departing from the scope of the present disclosure.

Image data captured by the optical module 104 may be combined or merged together to produce a combined image. For example, by correlating overlapping regions in the respective fields-of-view 108A, 108B of the ISLAs 106A, 106B, and by stitching together the data captured by the ISLAs 106A, 106B, a cohesive, combined spherical or panoramic image may be generated. In certain implementations of the DICD 100, it is envisioned that the generation of such an image may include additional supportive processes, such as three-dimensional (or spatiotemporal) noise reduction (3DNR) and/or matching pixels along the stitch boundary to reduce (or entirely eliminate) discontinuities.

To facilitate image processing and general operability, the DICD 100 may also include a variety of additional components, such as one or more processors 120 (FIG. 3) (e.g., a camera system-on-chip), a communications interface 122 (e.g., for transferring images to other devices), a user interface 124, and a power source (e.g., a battery) 126, which may be charged in any suitable manner (e.g., wirelessly or through a micro-USB interface). It is envisioned that the various components of the DICD 100 may communicate with one other in any suitable manner, such as, for example, via a bus 128.

The processor(s) 120 are configured to receive a first image from the ISLA 106A and a second image from the ISLA 106B, and may be configured to perform image signal processing (e.g., filtering, tone mapping, stitching, and/or encoding) to generate output images based on the image data received from the ISLAs 106A, 106B. The processor(s) 120 may include one or more individual processors (with single or multiple processing cores), and may include any suitable memory, such as, for example, a random-access memory device (RAM), flash memory, or other such storage medium (e.g., a non-transitory computer-readable memory). It is envisioned that the memory may include executable instructions and/or data that is accessible by the processor(s) 120. For example, the processor(s) 120 may include one or more dynamic random-access memory (DRAM) modules, such as double data rate synchronous dynamic random-access memory (DDR SDRAM), a digital signal processor (DSP), and/or an application-specific integrated circuit (ASIC) (e.g., a custom image signal processor).

The communications interface 122 (FIG. 3) may be used to receive commands that control image capture and/or processing in the DICD 100 and may be configured to transfer image data to another device. For example, the communications interface 122 may enable communications with a personal computing device, a smartphone, a tablet computer, a phablet, a smart watch, a portable computer, and/or any other such device or combination of devices that are configured to receive user input and/or communicate information with the DICD 100. In various implementations of the DICD 100, it is envisioned that the communications interface 122 may include a wired interface (e.g., a high-definition multimedia interface (HDMI), a universal serial bus (USB) interface, or a FireWire interface), or a wireless interface (e.g., a Bluetooth interface, a ZigBee interface, or a Wi-Fi interface).

Figure 3:
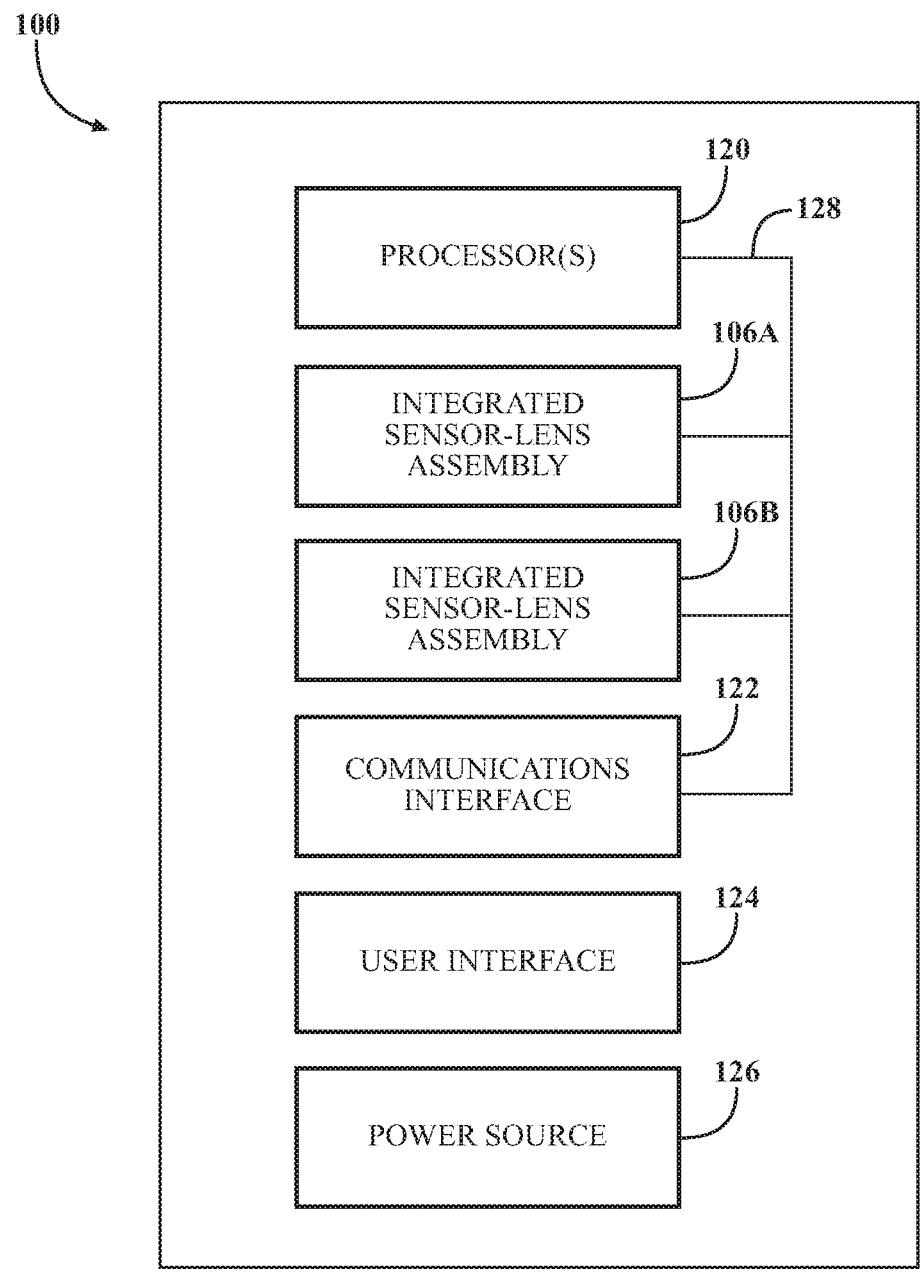
FIG. 3 is block diagram illustrating various internal components of the DICD.
Figure 4:
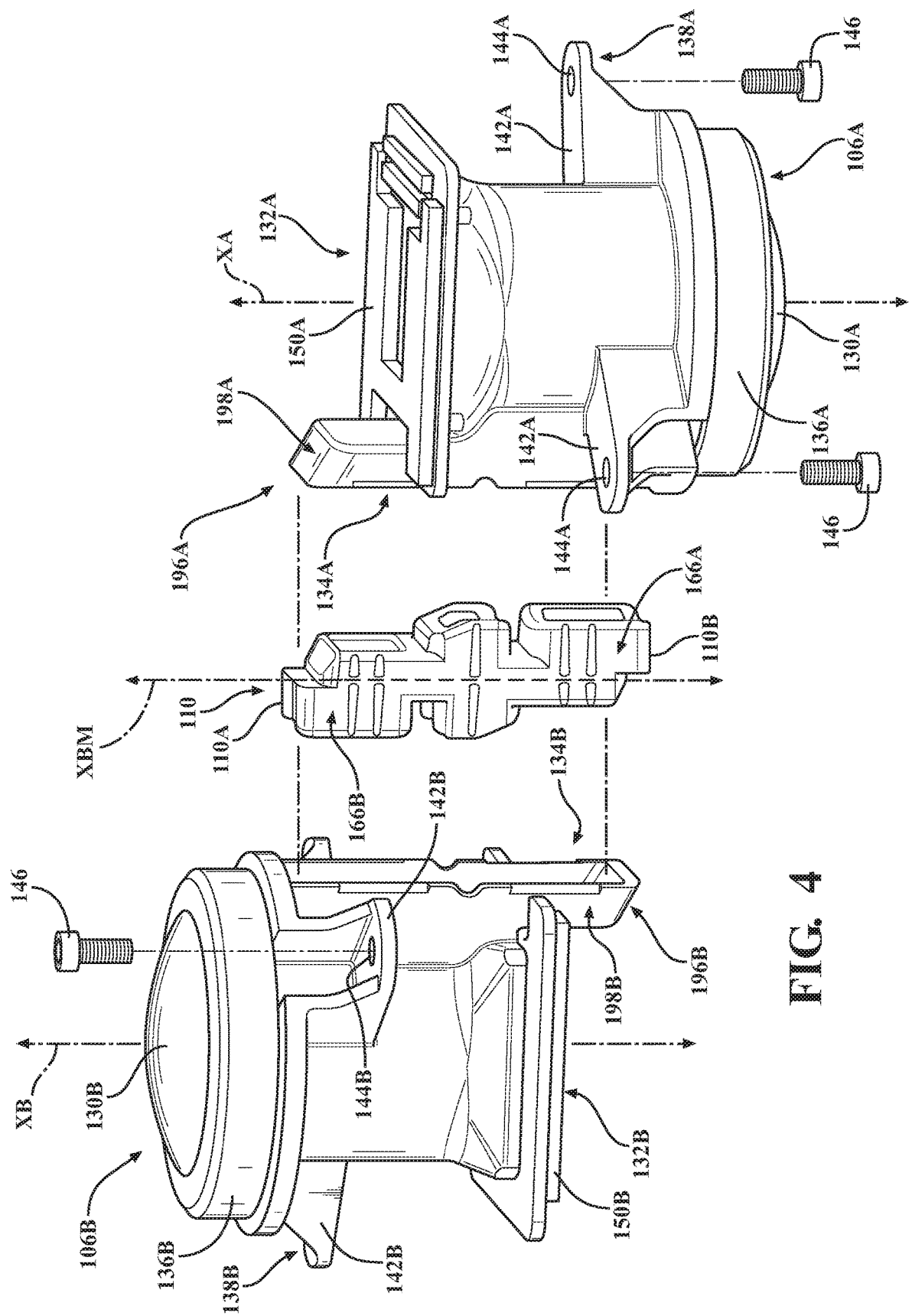
FIG. 4 is a top, perspective view of the optical module with parts separated illustrating connection of the ISLAs using a bridge member.

With continued reference to FIG. 3, the user interface 124 may include one or more buttons or switches to allow a user to control the image capture functions of the DICD 100, to view or scroll through images, to power the DICD 100 on and off, etc. For example, the user interface 124 may be configured to receive information that identifies a user setting, such as an image resolution setting (e.g., 3840 pixels by 2160 pixels), a frame rate setting (e.g., 60 frames per second), a location setting, and/or a context setting used to indicate an activity, such as mountain biking, in response to user input. The user interface 124 may communicate such settings, or related information, to the DICD 100, and may display, or otherwise present, content acquired by the DICD 100 (e.g., images or video). For example, the user interface 124 may include a display, such as a viewport into the three-dimensional space represented by the images and/or video captured or generated by the DICD 100.

It is envisioned that the user interface 124 may also communicate additional information to the DICD 100, such as metadata, orientation information, etc. For example, the user interface 124 may send information pertaining to a defined coordinate system to the DICD 100 such that the DICD 100 may determine an orientation of the user interface 124 relative to the DICD 100. Based on the determined orientation, the DICD 100 may identify a portion of the images and/or video captured by the DICD 100 for the DICD 100 to send to the user interface 124 for presentation as the viewport. In some implementations, based on the determined orientation, the DICD 100 may ascertain the location of the user interface 124 and/or the dimensions for viewing of a portion of the images and/or video.

In certain embodiments, the DICD 100 may include one or more hardware or software components that support and facilitate global tone mapping against pixels of a captured image. In such embodiments, it is envisioned that during global tone mapping, such hardware and/or software components may integrate color correction operations. Additionally, although not shown in the figures, the DICD 100 may include one or more other information sources or sensors, such as an inertial measurement unit (IMU), an orientation sensor, an accelerometer, a gyroscope, a magnetometer, a global positioning system (GPS) receiver component, an altimeter, a pressure sensor, a temperature sensor, a heart rate sensor, or any other such unit.

It is also envisioned that the DICD 100 may include one or more applications that may be implemented or executed to manage or control the DICD 100 (e.g., via the user interface 124). For example, such applications may control the configuration of the DICD 100, video acquisition, video display, or any other configurable or controllable aspect of the DICD 100. Via such applications, it is envisioned that the DICD 100 may generate and share (e.g., via a cloud-based or social media service) one or more images and/or video files (e.g., in response to a corresponding input by the user); that the DICD 100 may be remotely controlled; that unprocessed or minimally processed images and/or video may be displayed contemporaneously with capture (e.g., for shot framing); that one or more key moments may be marked contemporaneously with image or video capture using a tag (e.g., in response to user input), and that such tags may be displayed or otherwise presented (e.g., in a camera roll application for location review and/or playback of video); and/or that software and/or hardware on the DICD 100 may be wirelessly controlled (e.g., via a web-based graphical interface accessible by a user for selecting a live or previously recorded video stream).

With reference now to FIGS. 2 and 4-6, the ISLAs 106A, 106B will be discussed. As mentioned above, in certain embodiments of the disclosure, it is envisioned that the ISLAs 106A, 106B, and the components thereof, may be identical in configuration (e.g., to reduce the number of different components forming the DICD 100, manufacturing complexity, cost, etc.). As discussed in further detail below, however, the present disclosure also contemplates non-identical ISLAs. For example, in the embodiment illustrated throughout the figures, the ISLA 106A includes: a lens 130A defining an optical axis XA (FIG. 1A); an electronics assembly 132A (FIGS. 2, 4-6); and a mount 134A that supports the lens 130A and the electronics assembly 132A; and the ISLA 106B includes: a lens 130B defining an optical axis XB (FIG. 1A); an electronics assembly 132B (FIGS. 2, 4-6); and a mount 134B that supports the lens 130B and the electronics assembly 132B. The ISLAs 106A, 106B may also include respective trim rings 136A, 136B that are positioned about the lenses 130A, 130B to assist in securing the lenses 130A, 130B to the mounts 134A, 134B and/or increase the overall exterior aesthetic appeal of the ISLAs 106A, 106B. It is also envisioned that the trim rings 136A, 136B may be configured and positioned to create a watertight interface with the body 102 (FIGS. 1A, 1B) of the DICD 100 (e.g., to facilitate use of the DICD 100 in wet or underwater environments).

To facilitate positioning of the ISLAs 106A, 106B within the body 102 of the DICD 100, the mounts 134A, 134B include interfaces 138A, 138B, respectively, that correspond in configuration and position to internal engagement structures 140 (FIG. 2) included on the body 102. For example, in the illustrated embodiment, the interfaces 138A, 138B include a series of flanges 142A, 142B defining openings 144A, 144B that are configured to receive fasteners 146 (FIG. 4) (e.g., screws, rivets, clips, or the like). It is envisioned that the fasteners 146 may be used to either fixedly secure the ISLAs 106A, 106B to the body 102 of the DICD 100, or that the fasteners 146 may allow for removal of the ISLAs 106A, 106B (e.g., to facilitate the repair or replacement of the ISLA 106A and/or the ISLA 106B, or one or more of the components thereof). In addition to facilitating secured engagement between the ISLAs 106A, 106B and the body 102 of the DICD 100, it is envisioned that the interfaces 138A, 138B and the engagement structures 140 may act as positional location features to ensure proper orientation of the ISLAs 106A, 106B within the body 102 of the DICD 100 and mutual alignment of the ISLAs 106A, 106B in multiple (e.g., six) degrees-of-freedom, which is discussed in further detail below.

The ISLAs 106A, 106B are positioned in a back-to-back (Janus) configuration in which the ISLAs 106A, 106B are generally oriented in opposition. More specifically, the ISLAs 106A, 106B are rotated approximately 180° from one another such that the ISLA 106A faces in a first direction and the ISLA 106B faces in a second, opposite direction. The respective optical axes XA, XB of the ISLAs 106A, 106B are thus oriented in generally antiparallel relation (e.g., within a tolerance on the order of 1% to 10%, although tolerances outside this range would not be beyond the scope of the present disclosure).

As seen in FIG. 1A, in the illustrated embodiment, the ISLAs 106A, 106B are laterally offset from one another such that the optical axes XA, XB are separated by a distance D (FIG. 1A). By laterally separating the ISLAs 106A, 106B and the optical axes XA, XB, the overall thickness T (FIG. 1A) of the DICD 100 may be reduced when compared to designs in which the ISLAs 106A, 106B are not offset. For example, the back-to-back offset arrangement of the ISLAs 106A, 106B may allow the overall thickness T of the DICD 100 to approximate that of a single-lens barrel, as opposed to twice the thickness of a single lens barrel. Although each of the optical axes XA, XB is illustrated as being offset from a central axis X (FIG. 1A) of the DICD 100, in certain embodiments of the disclosure, it is envisioned that the DICD 100 may be configured such that the optical axis X is aligned with the optical axis XA or the optical axis XB.

The electronics assemblies 132A, 132B are positioned behind (e.g., inwardly of) the lenses 130A, 130B, respectively, and include image sensors 148A, 148B (FIGS. 5A, 6), respectively, as well as various other electrical components that support the capture and processing of digital images. For example, the electronics assemblies 132A, 132B may further include printed circuit boards 150A, 150B supporting the image sensors 148A, 148B and protective covers 152A, 152B (e.g., glass overlays) for the image sensors 148A, 148B, respectively, connectors, wires, etc.

The image sensors 148A, 148B are configured to detect light of a certain spectrum (e.g., the visible spectrum or the infrared spectrum), and convey information representative of an image as one or more electrical signals (e.g., analog or digital signals). For example, the image sensors 148A, 148B may include CCDs or active pixel sensors in a CMOS, and, in certain embodiments, may include digital-to-analog converters. Suitable examples of the image sensors 148A, 148B include, but are not limited to, charge-coupled device (CCD) sensors, active pixel sensors (APS), complementary metal-oxide-semiconductor (CMOS) sensors, and N-type metal-oxide-semiconductor (NMOS) sensors. In certain embodiments, the image sensors 148A, 148B may be adapted to capture hyper-hemispherical image planes from light entering the lenses 130A, 130B corresponding to the fields-of-view 108A, 108B (FIG. 2), respectively, and may be positioned in generally orthogonal relation to the optical axes XA, XB (FIG. 1A) of their respective lenses 130A, 130B (e.g., within a tolerance on the order of 0.5% to 2%, although tolerances outside this range would not be beyond the scope of the present disclosure).

Figure 2:
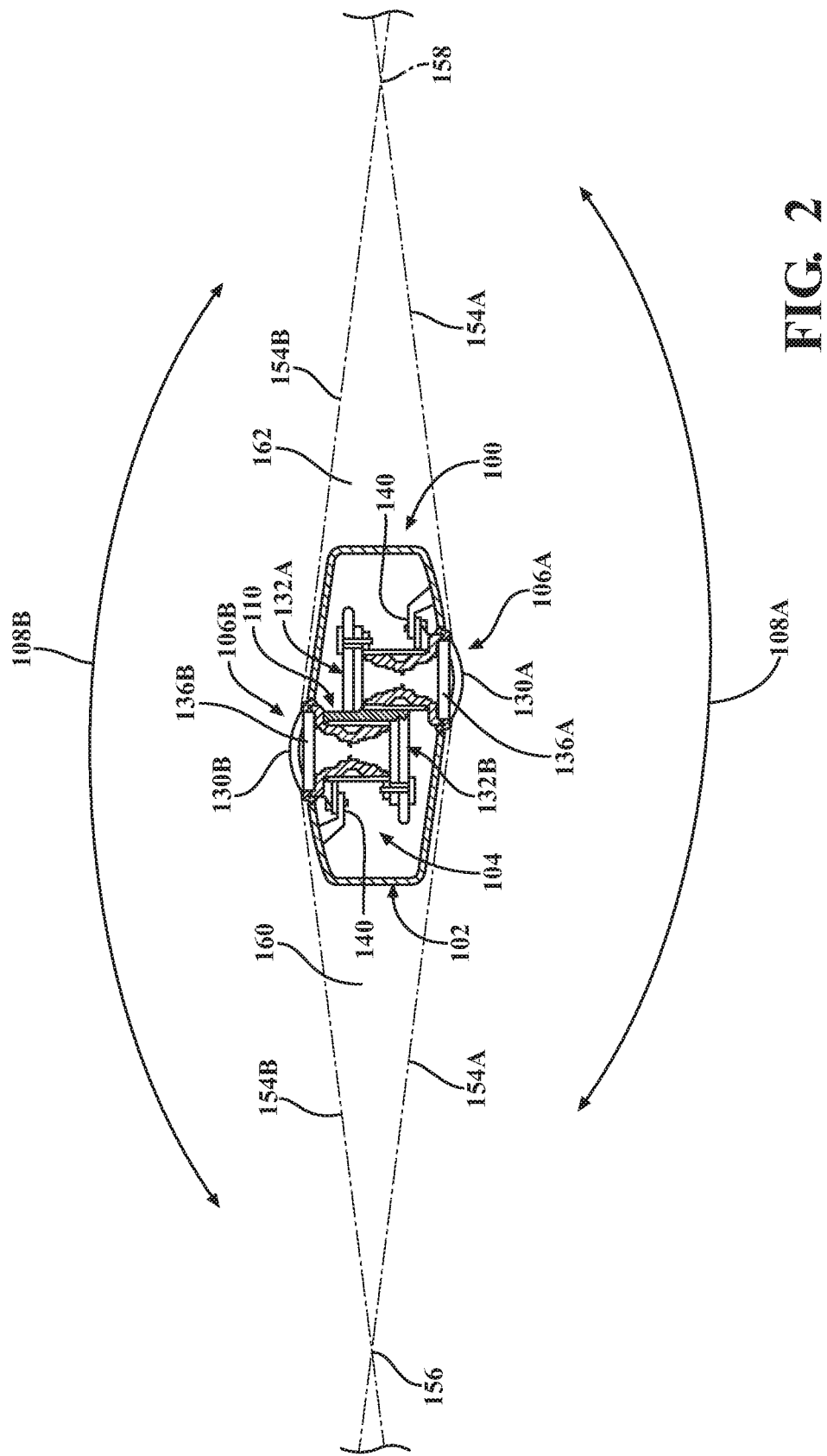
FIG. 2 is a cross-sectional view of the DICD taken through lines 2-2 in FIGS. 1A and 1B.

As seen in FIG. 2, the fields-of-view 108A, 108B of the ISLAs 106A, 106B are respectively defined by boundaries 154A, 154B. To facilitate the capture and generation of spherical images, it is envisioned that the fields-of-view 108A, 108B may overlap at stitch points 156, 158. For example, each of the fields-of-view 108A, 108B may lie substantially within the range of approximately 180° to 210°, although larger and smaller values for the field-of-view 108A and/or the field-of-view 108B would not be beyond the scope of the present disclosure.

Depending upon the particular configuration and orientation of the ISLAs 106A, 106B, one or more blind spots 160, 162 (or other such areas) may be outside of the respective fields-of-view 108A, 108B of the lenses 130A, 130B. In the blind spots 160, 162, light may be obscured from the lenses 130A, 130B and the corresponding image sensors 148A, 148B (FIGS. 5A, 6), and content in the blind spots 160, 162 may be omitted from capture. As such, in certain embodiments, the DICD 100 may be configured to reduce (or eliminate) the blind spots 160, 162 (e.g., by varying the particular configurations and/or orientations of the ISLAs 106A, 106B and the components thereof). For example, by reducing the distance D (i.e., the lateral offset between the ISLAs 106A, 106B) (FIG. 1A), the overlap in the fields-of-view 108A, 108B may be improved.

A small change in the alignment of the lenses 130A, 130B and/or the image sensors 148A, 148B (e.g., tilting) may change the relative positions of the fields-of-view 108A, 108B, the locations of the stitch points 156, 158, and the sizes of the blind spots 160, 162, and may impact image quality. Additionally, incomplete or inaccurate information regarding the alignment of the ISLAs 106A, 106B (e.g., the locations of the stitch points 156, 158) may decrease the quality and/or accuracy of combined (stitched) images and may also impact the efficiency with which combined images are generated. In some implementations, it is envisioned that the DICD 100 may maintain information indicating the location and orientation of the lenses 130A, 130B and/or the image sensors 148A, 148B such that the fields-of-view 108A, 108B and/or the stitch points 156, 158 may be accurately determined (e.g., to improve the accuracy of combined images and/or the efficiency with which combined images are generated).

With reference now to FIGS. 4-12 in particular, the bridge member 110 and connection of the ISLAs 106A, 106B will be discussed. The bridge member 110 is configured as a discrete (separate) structure that is connectable to (e.g., engageable with) the mounts 134A, 134B to fixedly connect the ISLAs 106A, 106B. For example, it is envisioned that the bridge member 110 may be configured to mechanically engage the mounts 134A, 134B in a clearance or interference, in a snap-fit arrangement, or through the employ of one or more mechanical connectors (e.g., screws, detents, clips, or other such fasteners). Additionally, or alternatively, as illustrated throughout the figures, the bridge member 110 may be secured to the mounts 134A, 134B using an adherent 164 (e.g., an adhesive), which may be positioned internally (e.g., between the mounts 134A, 134B and the bridge member 110, as seen in FIG. 5A) and/or externally (e.g., at the interface between the mounts 134A, 134B, as seen in FIG. 5B).

In certain embodiments, it is envisioned that the bridge member 110 and the mounts 134A, 134B may include (e.g., may be formed from) the same material or combination of materials such that the coefficients of thermal expansion for the bridge member 110 and the mounts 134A, 134B are either identical or substantially similar. For example, in one embodiment of the disclosure, the bridge member 110 and the mounts 134A, 134B may each be formed from liquid crystal polymer. Consistency between the material(s) of construction used in the bridge member 110 and the mounts 134A, 134B facilitates uniformity in the expansion and contraction of the bridge member 110 and the mounts 134A, 134B (e.g., upon exposure of the DICD 100 to different temperatures and/or during temperature changes within the DICD 100) to maintain the connection between the bridge member 110 and the mounts 134A, 134B, and thus, the relative positions and alignment of the ISLAs 106A, 106B, which is discussed in further detail below.

The bridge member 110 includes opposite ends 110A, 110B (FIGS. 4, 7, 8), and defines a longitudinal axis XBM (FIGS. 4, 7, 8) that extends there between in generally parallel relation to the optical axes XA, XB. The bridge member 110 includes a first bridge portion 166A that faces the mount 134A and a second bridge portion 166B that faces the mount 134B. In alternate embodiments of the disclosure, it is envisioned that the bridge portions 166A, 166B may be discrete structures that are mechanically and/or chemically secured together (e.g., via one or more fasteners, adhesives, etc.), or, alternatively, that the bridge portions 166A, 166B may be integrally (e.g., monolithically) formed, as shown throughout the figures, such as through injection molding, 3-D printing, etc.

The bridge portions 166A, 166B are identical in configuration and are positioned in generally opposite orientations (i.e., the bridge portions 166A, 166B are rotated approximately 180° from one another and face in opposite directions). More specifically, the bridge portion 166A defines opposite side walls 168A, 170A (FIGS. 7, 8) and opposite end walls 172A, 174A, and includes a first end section 176A, an opposite second end section 178A, and an intermediate section 180A that is positioned between the end sections 176A, 178A. Correspondingly, the bridge portion 166B defines opposite side walls 168B, 170B and opposite end walls 172B, 174B, and includes a first end section 176B, an opposite second end section 178B, and an intermediate section 180B that is positioned between the end sections 176B, 178B. While the end walls 172A, 172B are illustrated as extending transversely in relation to the optical axes XA, XB (FIG. 4) (i.e., as extending along axes that intersect the optical axes XA, XB so as to subtend acute angles therewith) and the end walls 174A, 174B are illustrated as extending in generally orthogonal relation to the optical axes XA, XB in the particular embodiment of the bridge member 110 shown throughout the figures, in alternate embodiments of the disclosure, the configurations of the end walls 172A, 174A and the end walls 172B, 174B may be varied. For example, it is envisioned that the end walls 172A, 172B may also extend in generally orthogonal relation to the optical axes XA, XB such that the end walls 172A, 174A extend in generally parallel relation to the end walls 172B, 174B, respectively.

Figure 7:
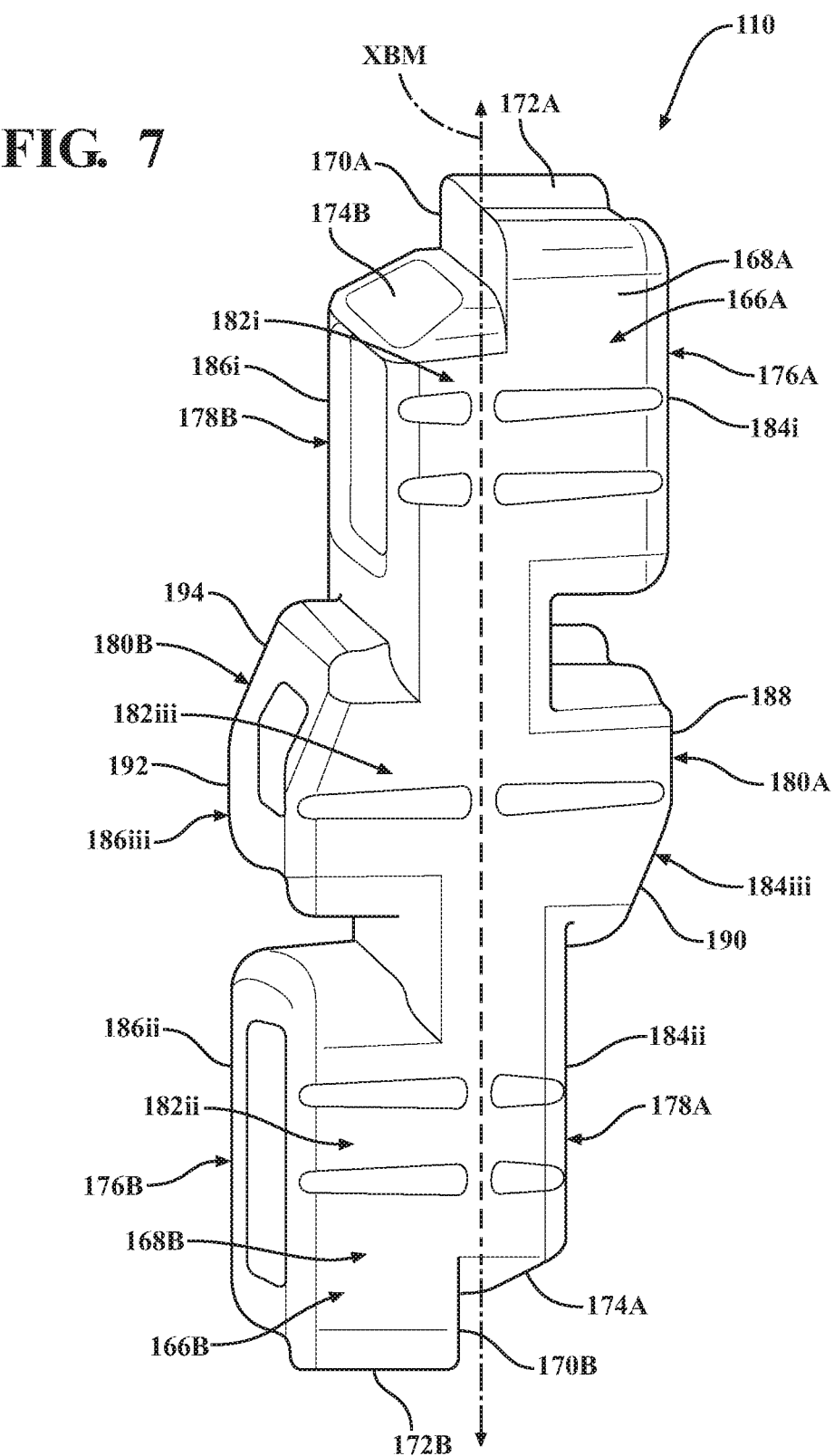
FIG. 7 is a bottom, perspective view of the presently disclosed bridge member.
Figure 8:
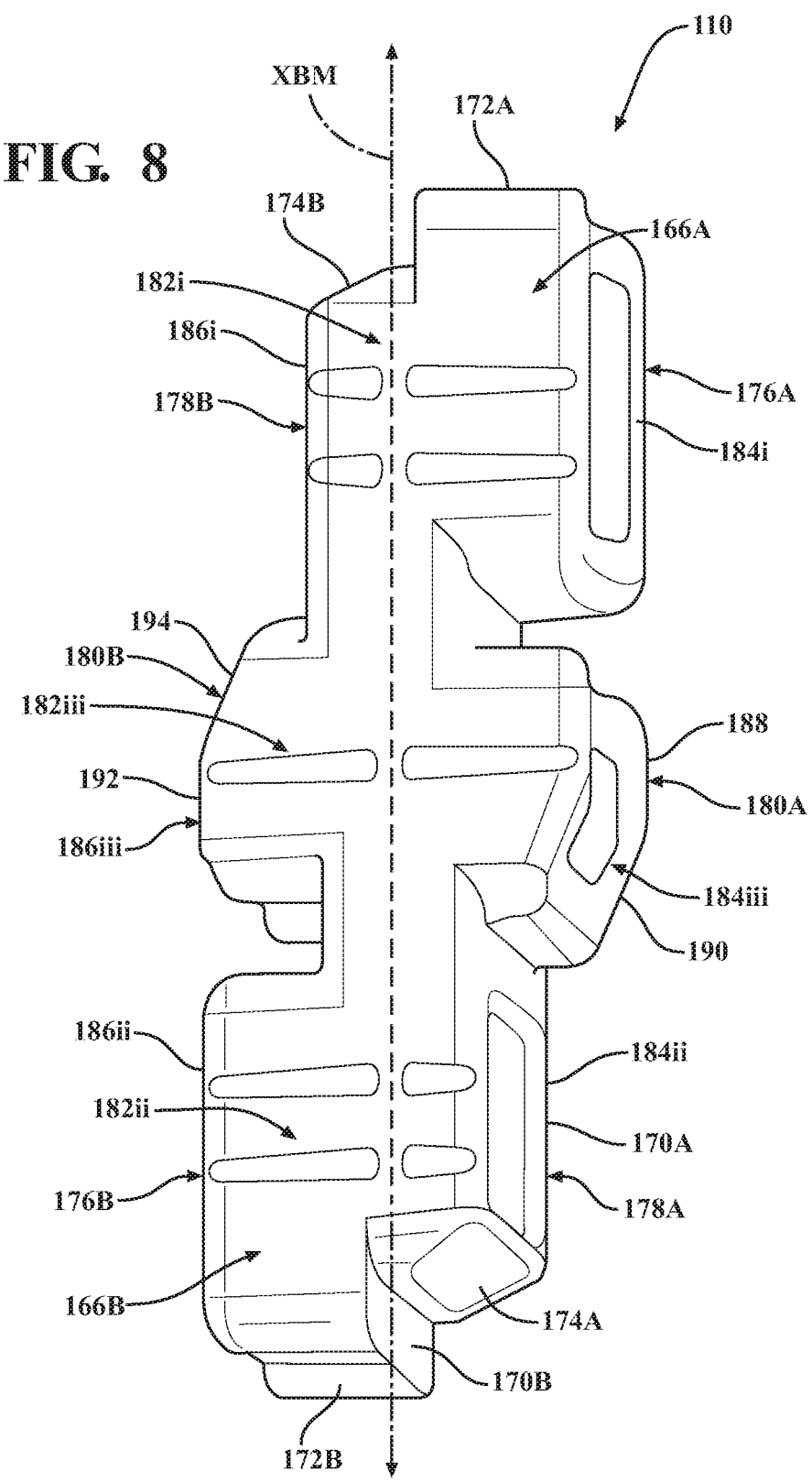
FIG. 8 is a top, perspective view of the presently disclosed bridge member.
Figure 9:
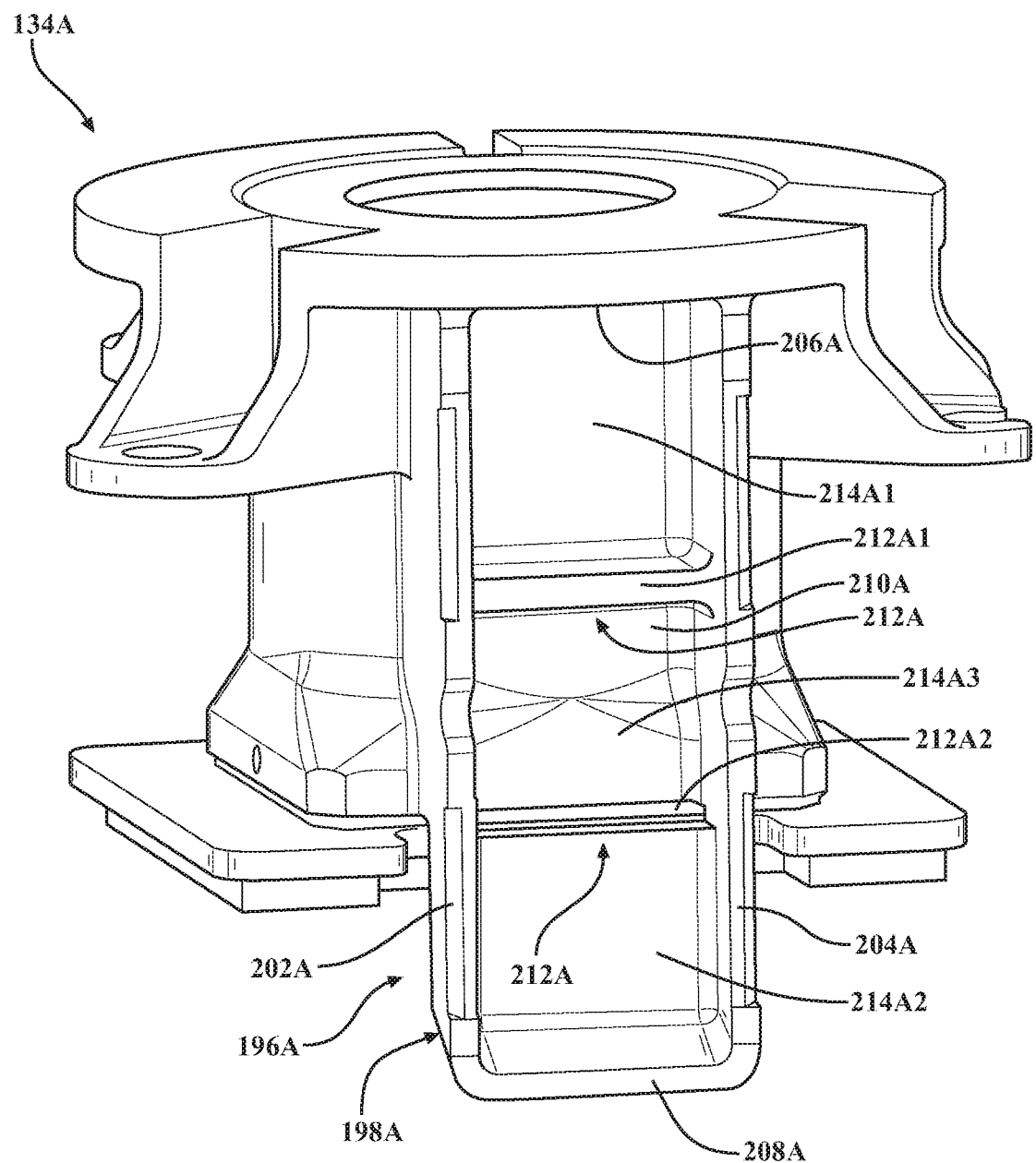
FIG. 9 is a partial, top, perspective view of the first ISLA.
Figure 10:
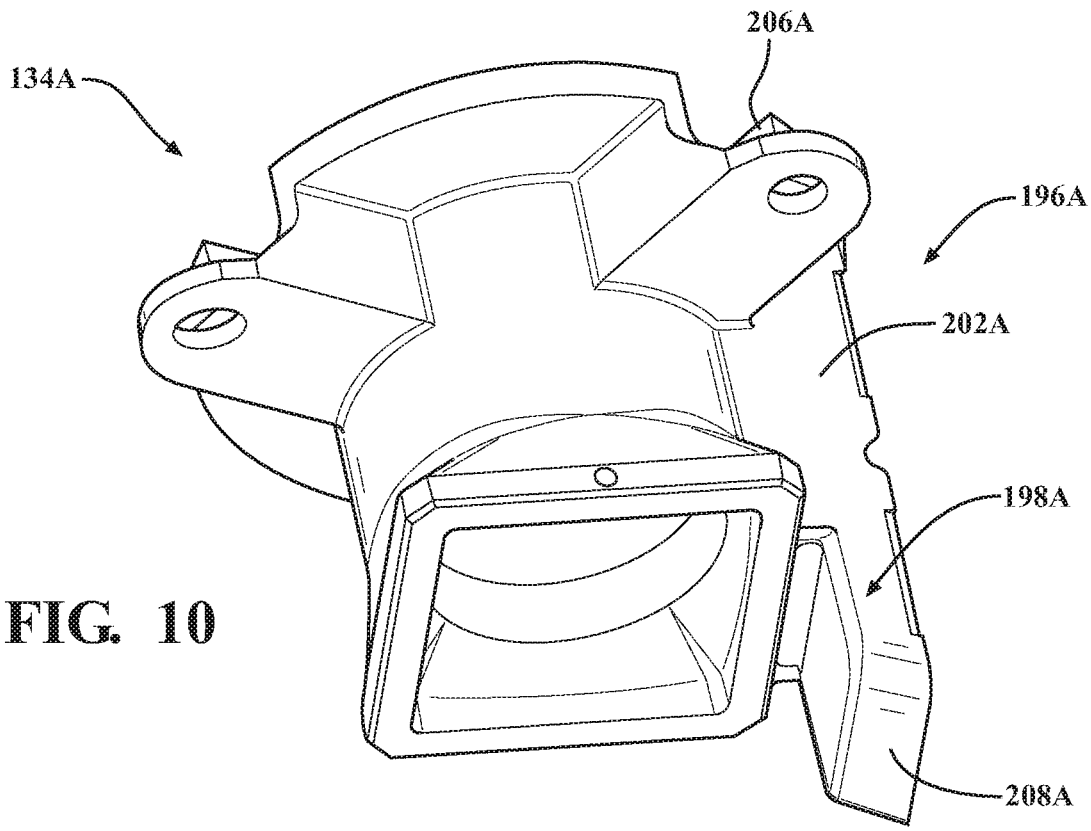
FIG. 10 is a partial, bottom, perspective view of the ISLA seen in FIG. 9.
Figure 11:
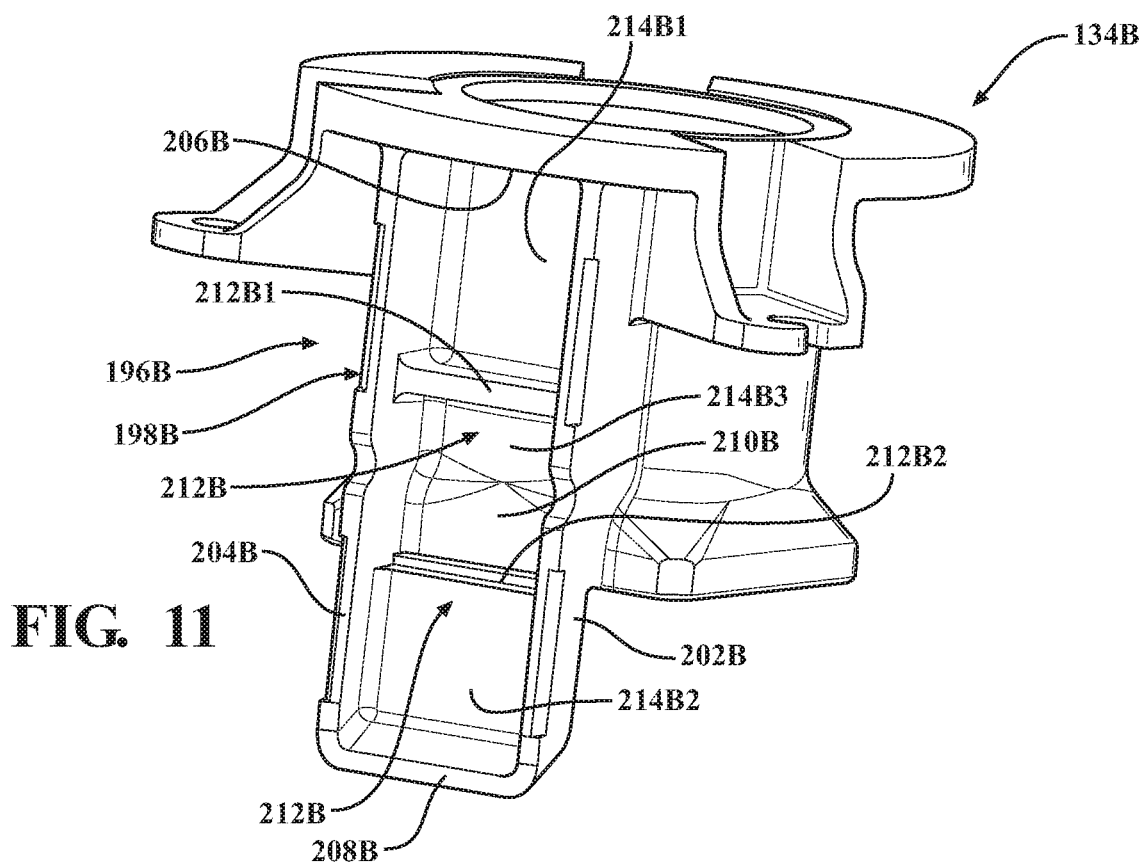
FIG. 11 is a partial, top, perspective view of the second ISLA.
Figure 12:
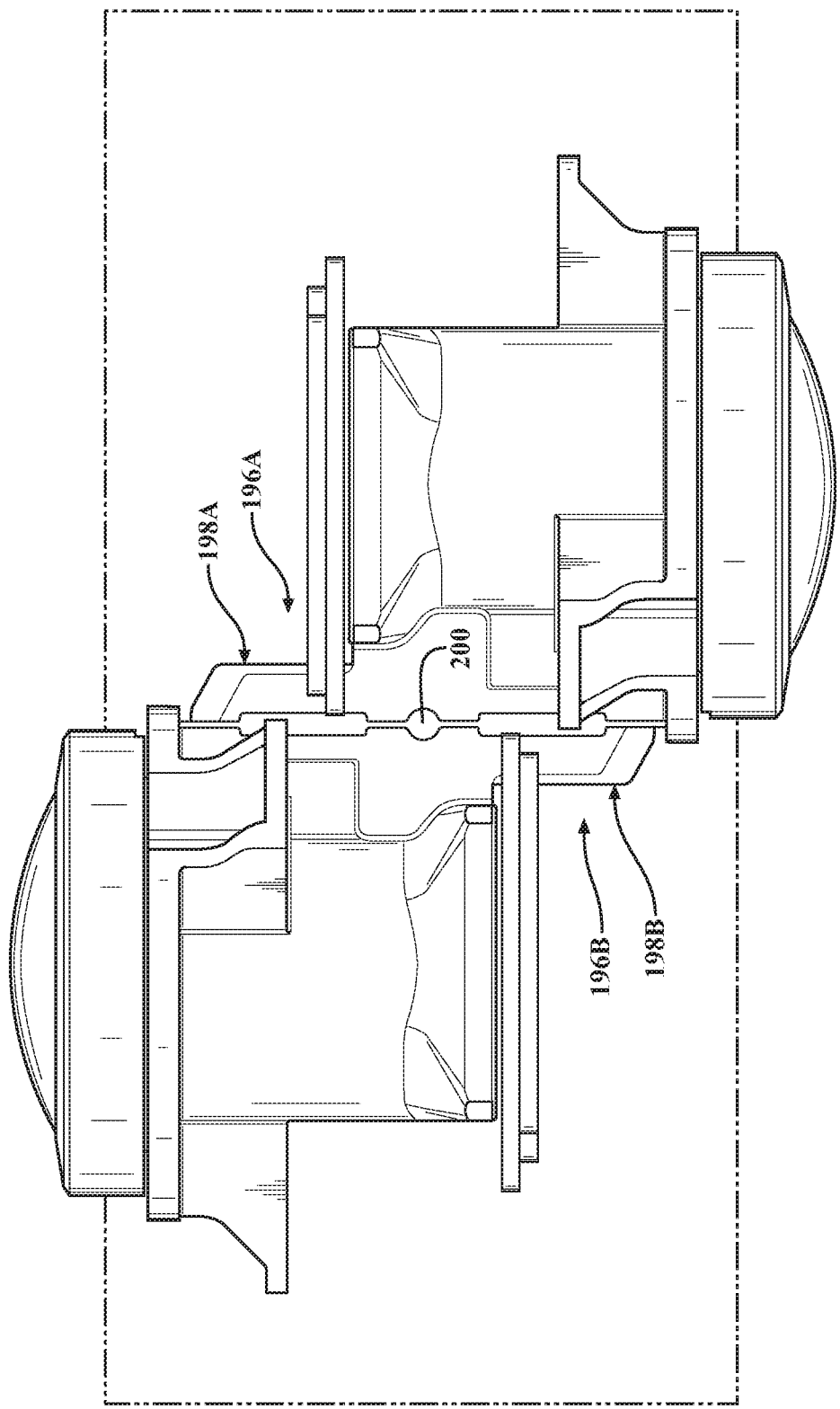
FIG. 12 is a top, perspective view of the optical module upon assembly.

As seen in FIGS. 7 and 8, for example, the first end section 176A of the bridge portion 166A is positioned generally opposite the second end section 178B of the bridge portion 166B so as to define a first node 182i, the second end section 178A of the bridge portion 166A is positioned generally opposite the first end section 176B of the bridge portion 166B so as to define a second node 182ii, and the intermediate section 180A of the bridge portion 166A is positioned generally opposite the intermediate section 180B of the bridge portion 166B so as to define a third node 182iii. The first node 182i defines opposite end faces 184i, 186i, the second node 182ii defines opposite end faces 184ii, 186ii, and the third node 182iii defines opposite end faces 184iii, 186iii. Whereas the end faces 184i, 186i of the first node 182i and the end faces 184ii, 186ii of the second node 182ii are each generally planar in configuration and extend in generally parallel relation to the optical axes XA, XB, the end faces 184iii, 186iii are non-planar in configuration. More specifically, the end face 184iii of the third node 182iii includes respective first and second segments 188, 190, and the end face 186iii of the third node 182iii includes respective first and second segments 192, 194. The third node 182iii is configured such that the segments 188, 192 extend in generally parallel relation to the optical axes XA, XB (FIG. 4), and the segments 190, 194 extend transversely in relation to the optical axes XA, XB (i.e., the segments 190, 194 extend along axes that intersect the optical axes XA, XB so as to subtend acute angles therewith).

Depending on the particular configuration and/or orientation of the mounts 134A, 134B, for example, it is envisioned that the particular configurations of the bridge portions 166A, 166B (e.g., the nodes 182i-182iii) may be varied in alternate embodiments of the disclosure. For example, it is envisioned that the end faces 184i-184iii, 186i-186iii may include non-linear (e.g., arcuate) portions, that the number and/or specific locations of the nodes 182i-182iii may be varied (e.g., the bridge member 110 may include a single node 182 only, or a pair of nodes 182i, 182ii), etc. Additionally, while the bridge portions 166A, 166B are illustrated as being generally aligned throughout the figures such that the side walls 168A, 168B and the side walls 170A, 170B are generally coplanar, in alternate embodiments of the disclosure, it is envisioned that the bridge portions 166A, 166B may be offset (i.e., along an axis extending in orthogonal relation to the optical axes XA, XB and parallel to the respective front and rear faces 102A, 102B (FIG. 1A) of the body 102 of the DICD 100) such that the side walls 168A, 168B and the side walls 170A, 170B are oriented in different planes.

Figure 5A:
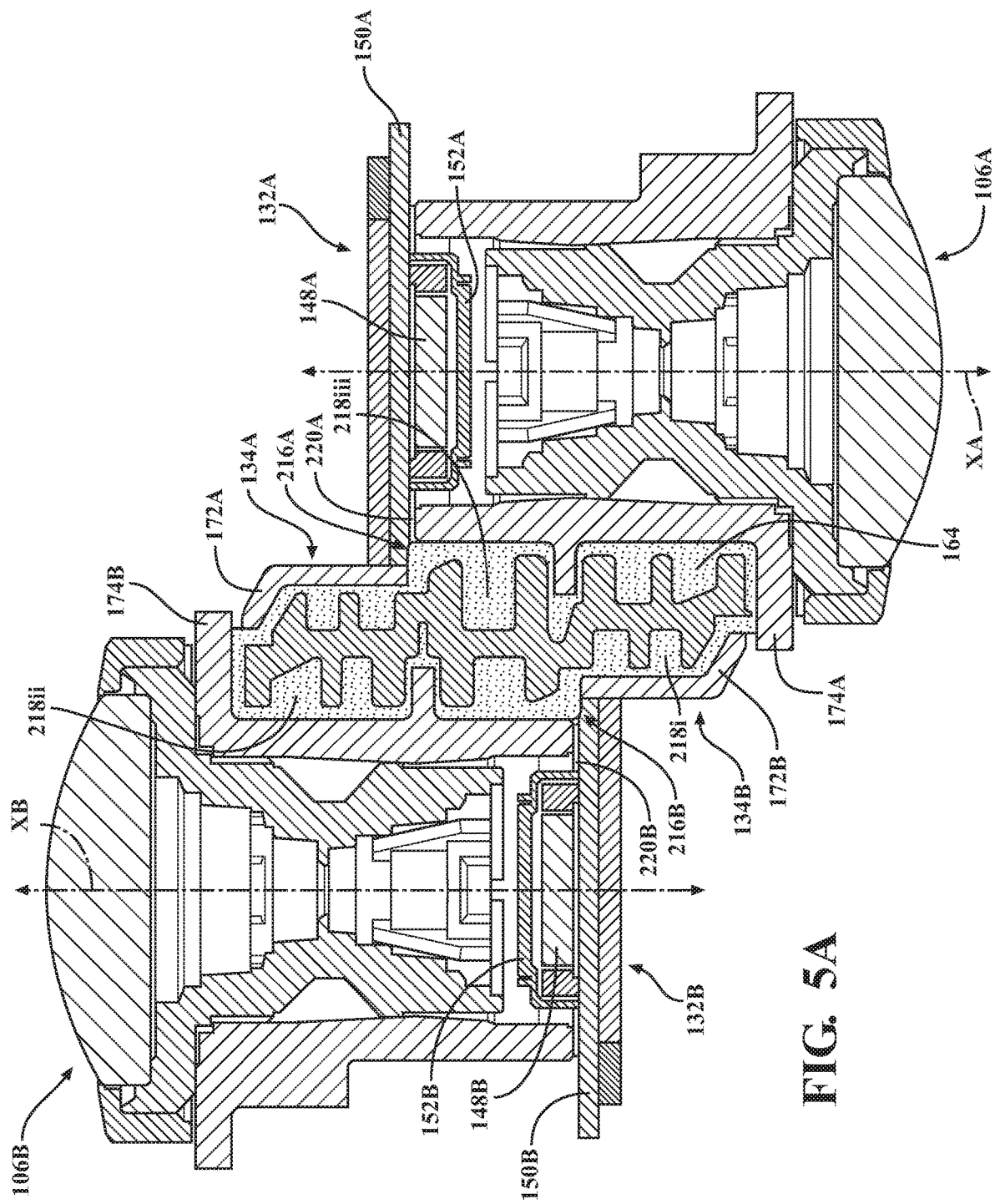
FIG. 5A is a top, cross-sectional view of the optical module upon assembly.
Figure 6:
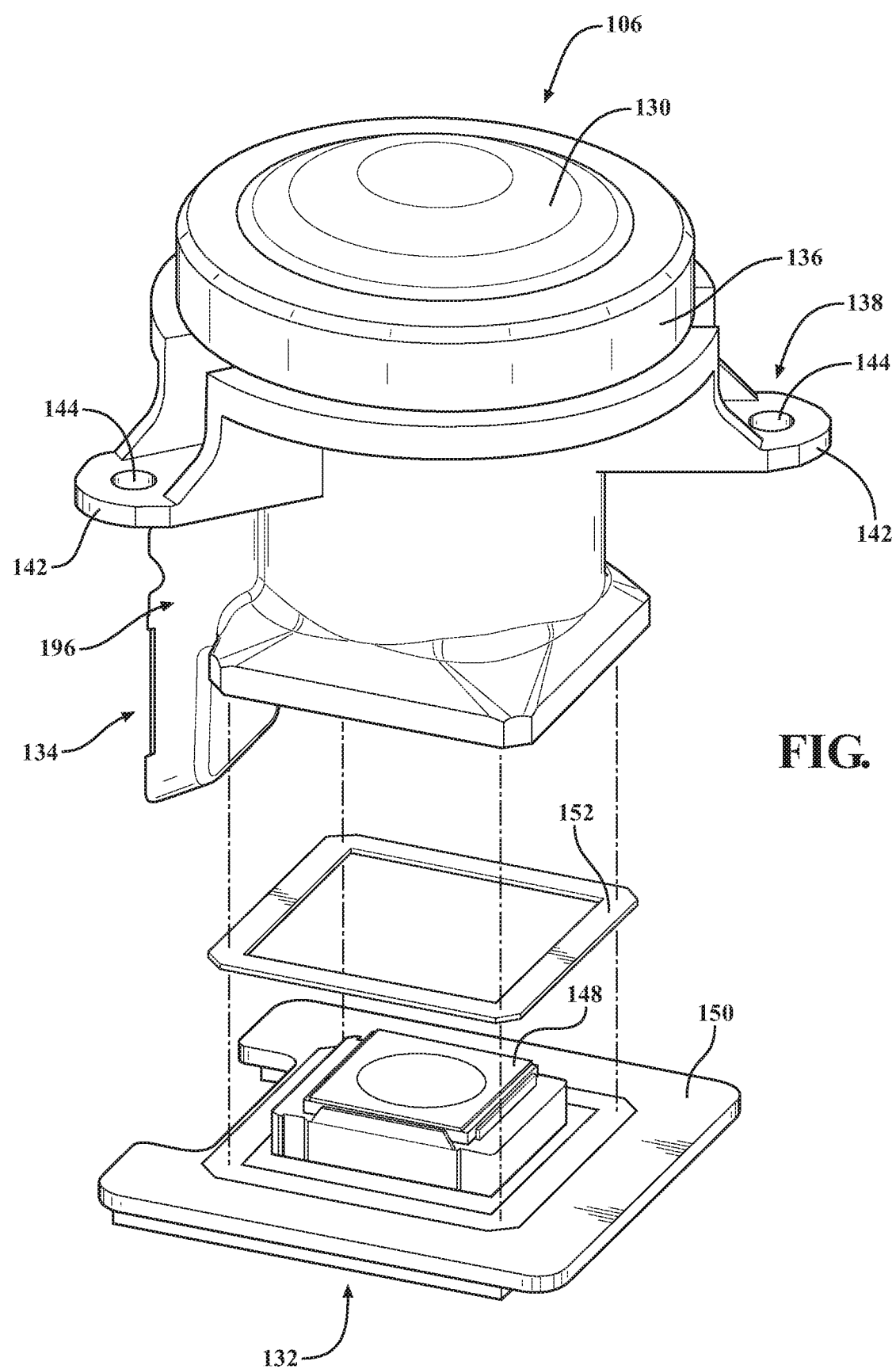
FIG. 6 is a top, perspective view of one of the ISLAs with parts separated.

As seen in FIGS. 9-12, the mounts 134A, 134B respectively include cradles 196A, 196B that are configured to receive the bridge member 110. More specifically, the cradles 196A, 196B include receptacles 198A, 198B that collectively define a cavity 200 that is configured to receive the bridge member 110 (FIGS. 5A, 7, 8) such that the bridge portion 166A is positioned within the receptacle 198A and the bridge portion 166B is positioned within the receptacle 198B. The cradle 196A includes: a pair of side walls 202A, 204A; a pair of end walls 206A, 208A; and a base wall 210A; and the cradle 196B includes: a pair of side walls 202B, 204B; a pair of end walls 206B, 208B; and a base wall 210B. As seen in FIG. 5A, the base walls 210A, 210B include offsets 216A, 216B, respectively, resulting in non-linear, interrupted configurations that accommodate the electronics assemblies 132A, 132B (e.g., the image sensors 148A, 148B), respectively. In alternate embodiments of the disclosure, however, it is envisioned that the offsets 216A, 216B may be omitted such that the base walls 210A, 210B are linear (and continuous) in configuration.

The cradles 196A, 196B also include a series of dividers 212A, 212B that are positioned between the end walls 206A, 208A and 206B, 208B. The dividers 212A, 212B extend inwardly (i.e., towards the optical axes XB, XA (FIG. 5A), respectively) and are configured and positioned to define a series of individual chambers 214A, 214B within the receptacles 198A, 198B. In the embodiment seen in FIGS. 9 and 11, for example, the cradle 196A includes a first divider 212A1 and a second divider 212A2, and the cradle 196B includes a first divider 212B1 and a second divider 212B2.

The dividers 212A1, 212A2 included in the first cradle 196A are positioned such that a first end chamber 214A1 is defined between the end wall 206A and the first divider 212A1, a second end chamber 214A2 is defined between the divider 212A2 and the end wall 208A, and an intermediate chamber 214A3 is defined between the dividers 212A1, 212A2. Correspondingly, the dividers 212B1, 212B2 included in the second cradle 196B are positioned such that a first end chamber 214B1 is defined between the end wall 206B and the first divider 212B1, a second end chamber 214B2 is defined between the divider 212B2 and the end wall 208B, and an intermediate chamber 214B3 is defined between the dividers 212B1, 212B2. Although illustrated as including two dividers 212 and three chambers 214 in the embodiment shown throughout the figures, it should be appreciated that the number and particular locations of the dividers 212 and the chambers 214 may be varied in alternate embodiments of the disclosure (e.g., depending upon the particular configuration of the bridge member 110). For example, in certain embodiments, it is envisioned that the dividers 212 may be eliminated altogether such that the receptacles 198A, 198B respectively include single chambers 214A, 214B only.

The ISLAs 106A, 106B are oriented such that the first end chamber 214A1 is positioned generally opposite the second end chamber 214B2 so as to define a first cavity portion 218*i* (FIG. 5A), the second end chamber 214A2 is positioned generally opposite the first end chamber 214B1 so as to define a second cavity portion 218*ii*, and the intermediate chamber 214A3 is positioned generally opposite the intermediate chamber 214B3 so as to define a third cavity portion 218*iii*. Upon assembly of the optical module 104, the bridge member 110 is positioned between the ISLAs 106A, 106B such that the first node 182*i* (FIGS. 7, 8) is positioned within the first cavity portion 218*i* defined by the first end chamber 214A1 and the second end chamber 214B2, the second node 182*ii* is positioned within the second cavity portion 218*ii* defined by the second end chamber 214A2 and the first end chamber 214B1, and the third node 182*iii* is positioned within the third cavity portion 218*iii* defined by the intermediate chamber 214A3 and the intermediate chamber 214B3.

In the illustrated embodiment, as indicated above, the bridge member 110 is secured to the mounts 134A, 134B using the aforementioned adherent 164, which may partially or entirely surround the bridge member 110, as illustrated in FIG. 5A, and may be positioned at the interface between the mounts 134A, 134B, as illustrated in FIG. 5B. For example, as shown throughout the figures, the adherent 164 may be positioned between the base wall 210A (FIGS. 9-11) of the cradle 196A and the end faces 184*i*-184*iii* (FIGS. 7, 8) defined by the nodes 182*i*-182*iii*, respectively, and between the base wall 210B of the cradle 196B and the end faces 186*i*-186*iii* defined by the nodes 182*i*-182*iii*, respectively. To further secure the bridge member 110 to the mounts 134A, 134B, it is envisioned that the adherent 164 may also be positioned between the side walls 202A, 204A (FIGS. 9-11) of the cradle 196A and the side walls 168A, 170A (FIGS. 7, 8) of the bridge portion 166A, and between the side walls 202B, 204B of the cradle 196B and the side walls 168B, 170B of the bridge portion 166B, as well as between the end walls 206A, 208A (FIGS. 9-11) of the cradle 196A and the end walls 172A, 174A (FIGS. 7, 8) of the bridge portion 166A, and between the end walls 206B, 208B of the cradle 196B and the end walls 172B, 174B of the bridge portion 166B. The various walls 168, 170, 172, 174 and faces 184, 186 defined by the bridge member 110 increase the available, exposed surface area of the bridge member 110 for contact with the adherent 164 to increase the stability and/or permanence of the connection between the bridge member 110 and the ISLAs 106A, 106B.

In certain alternate embodiments of the disclosure, it is envisioned that the bridge member 110 may be eliminated (e.g., to save weight and reduce manufacturing complexity). In such embodiments, the mount 134A of the ISLA 106A and the mount 134B of the ISLA 106B may be secured directly to one another using the adherent 164.

Figure 13:
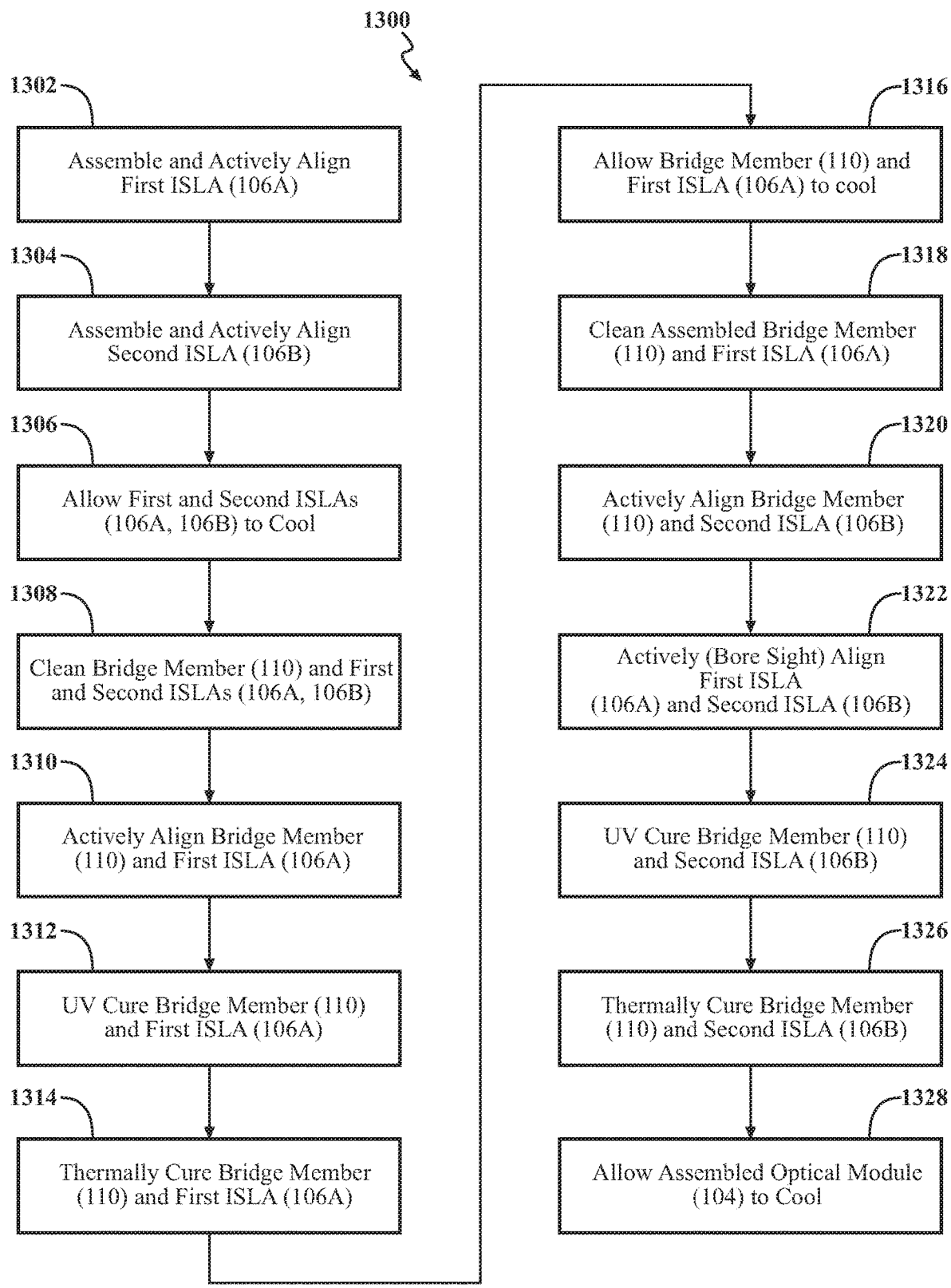
FIG. 13 is a flow chart illustrating a method of assembling the optical module.

With reference now to FIGS. 1A-12 and FIG. 13, a method 1300 (FIG. 13) of assembling the optical module 104 will be discussed. Initially, at steps 1302 and 1304, the ISLA 106A (FIGS. 2, 4, 5A, 5B) and the ISLA 106B are subjected to individual active alignment processes to achieve optimal alignment between the lens 130A and the image sensor 148A and between the lens 130B and the image sensor 148B, and thereby facilitate the capture and generation of focused, high-quality images. More specifically, the positions of the lens 130A and/or the image sensor 148A are continually adjusted (e.g., in six degrees-of-freedom) until the optical axis XA (FIG. 1A) is centered with respect to the image sensor 148A, which defines a plane that is generally orthogonal in relation to the optical axis XA, as can be appreciated through reference to FIG. 5A, and the positions of the lens 130B and/or the image sensor 148B are continually adjusted (e.g., in six degrees-of-freedom) until the optical axis XB is centered with respect to the image sensor 148B, which defines a separate plane that is generally orthogonal in relation to the optical axis XB, as can also be appreciated through reference to FIG. 5A. During the alignment process, as the lenses 130A, 130B and/or the image sensors 148A, 148B are repositioned, optical targets are viewed, and the modulation transfer function (MTF) at each target is monitored until each of the MTF values are within acceptable tolerances. Thereafter, the lenses 130A, 130B and the image sensors 148A, 148B are secured in place to maintain proper alignment. For example, the lenses 130A, 130B and the image sensors 148A, 148B may be secured by curing an adherent, such as an adhesive (e.g., using a UV light source and/or a heat source).

After actively aligning each of the ISLAs 106A, 106B, at step 1306, the ISLAs 106A, 106B are allowed to cool, and at step 1308 the ISLAs 106A, 106B and the bridge member 110 are cleaned (e.g., via a plasma cleaning process). The ISLAs 106A, 106B are then connected to form the optical module 104 by connecting the bridge member 110 (FIGS. 2, 4, 5A, 7, 8) to the first ISLA 106A using a first apparatus (e.g., a first robotic assembly) at steps 1310-1314, and, thereafter, connecting the second ISLA 106B to the assembly of the first ISLA 106A and the bridge member 110 using a second apparatus (e.g., a second robotic assembly) at steps 1320-1326. More specifically, the adherent 164 is applied to the bridge member 110 and/or the cradle 196A (e.g., internally and/or externally), and the first apparatus is used to orient the bridge member 110 and the cradle 196A such that the nodes 182*i*, 182*ii*, 182*iii* (FIGS. 7, 8) are respectively positioned within the chambers 214A1, 214A2, 214A3 (FIG. 9) defined by the receptacle 198A. During positioning of the bridge member 110, at step 1310, the first apparatus identifies and tracks the positions of the ISLA 106A and the bridge member 110, and views image targets through the ISLA 106A, using the coordinates of the ISLA 106A and the bridge member 110. The first apparatus continually adjusts and measures the relative positioning and alignment of the ISLA 106A and the bridge member 110 until the measurements fall within a predetermined threshold. Once proper alignment between the ISLA 106A and the bridge member 110 has been achieved, at step 1312, the assembly of the first ISLA 106A and the bridge member 110 is exposed to a UV light source to cure the adherent 164 (FIG. 5A). During UV curing, any adherent 164 applied to any of the exterior surfaces is hardened, and UV light passes through one or more openings 220A (FIG. 5A) (e.g., gaps) formed in the mount 134A to cure any adherent 164 positioned internally between the mount 134A and the bridge member 110. Thereafter, at step 1314, the assembly of the ISLA 106A and the bridge member 110 is placed into a thermal (heating) apparatus to further cure the adherent 164 and fix the connection between the ISLA 106A and the bridge member 110. Following thermal curing, the assembly of the ISLA 106A and the bridge member 110 is allowed to cool at step 1316, and the assembly of the ISLA 106A and the bridge member 110 is cleaned (e.g., using the aforementioned plasma cleaning process) at step 1318.

The ISLA 106B is then connected to the bridge member 110 using a similar procedure. More specifically, the adherent 164 is applied to the bridge member 110 and/or the cradle 196B (e.g., internally and/or externally), and the second apparatus is used to orient the bridge member 110 (which is connected to the ISLA 106A) and the cradle 196B such that the nodes 182*i*, 182*ii*, 182*iii* (FIGS. 7, 8) are respectively received by the chambers 214B2, 214B1, 214B3 (FIG. 11) defined by the receptacle 198B.During positioning of the bridge member 110, at step 1320, the second apparatus identifies and tracks the positions of the ISLA 106B and the bridge member 110, and views image targets through the ISLA 106B, using the coordinates of the ISLA 106B and the bridge member 110. The second apparatus continually adjusts and measures the relative positioning and alignment of the ISLA 106B and the bridge member 110 until the measurements fall within a predetermined threshold.

Once proper alignment between the ISLA 106A and the bridge member 110 has been achieved, prior to curing the adherent 164, at step 1322, the ISLAs 106A, 106B are actively aligned using a bore-sight alignment process similar to that discussed above with respect to the ISLAs 106A, 106B individually. The bore-sight alignment process achieves optimal alignment and orientation of the ISLAs 106A, 106B by continually adjusting the relative positioning between the ISLA 106A and the ISLA 106B (e.g., in six degrees-of-freedom) until the optical axes XA, XB (FIG. 1A) are oriented as desired (e.g., in anti-parallel relation). During the bore-sight alignment process, one or more optical targets are viewed through the ISLAs 106A, 106B as the relative repositioning of the ISLAs 106A, 106B is adjusted, and centering target values are examined and observed until the centering target values are within acceptable tolerances.

Once the ISLAs 106A, 106B have been properly aligned, the assembled optical module 104 is exposed to a UV light source at step 1324 to cure the adherent 164 (FIG. 5A). During UV curing, any adherent 164 applied to any of the exterior surfaces is hardened, and UV light passes through one or more openings 220B (FIG. 5A) (e.g., gaps) formed in the mount 134B to cure any adherent 164 positioned internally between the mount 134B and the bridge member 110. Thereafter, at step 1326, the optical module 104 is placed into a thermal (heating) apparatus to further cure the adherent 164 and fix the connection between the ISLA 106B and the bridge member 110, and the assembled optical module 104 is allowed to cool at step 1328.

Through optimal alignment of the ISLAs 106A, 106B, greater overlap in the fields-of-view 108A, 108B (FIG. 2) can be achieved, which allows for an increase in the quality of the combined images generated through image stitching, as well as overall image processing and resolution. Additionally, the active (bore-sight) alignment process described herein reduces the number of degrees of field of view angle that would otherwise be required by known additional procedures, such as image stabilization, thereby facilitating the creation of higher-resolution images.

With reference now to FIGS. 14-16B, alternate embodiments of the ISLAs 106A, 106B (which are identified by the reference characters 306A, 306B) will be discussed. The ISLAs 306A, 306B are generally similar to the ISLAs 106A, 106B discussed above, respectively, and, accordingly, in the interest of brevity, will be discussed only with respect to any differences therefrom.

The ISLAs 306A, 306B respectively include mounts 334A, 334B with cradles 396A, 396B. Whereas the ISLAs 106A, 106B are configured for use with the bridge member 110, the ISLAs 306A, 306B are configured for direct connection so as to obviate the need for the bridge member 110.

Figure 14:
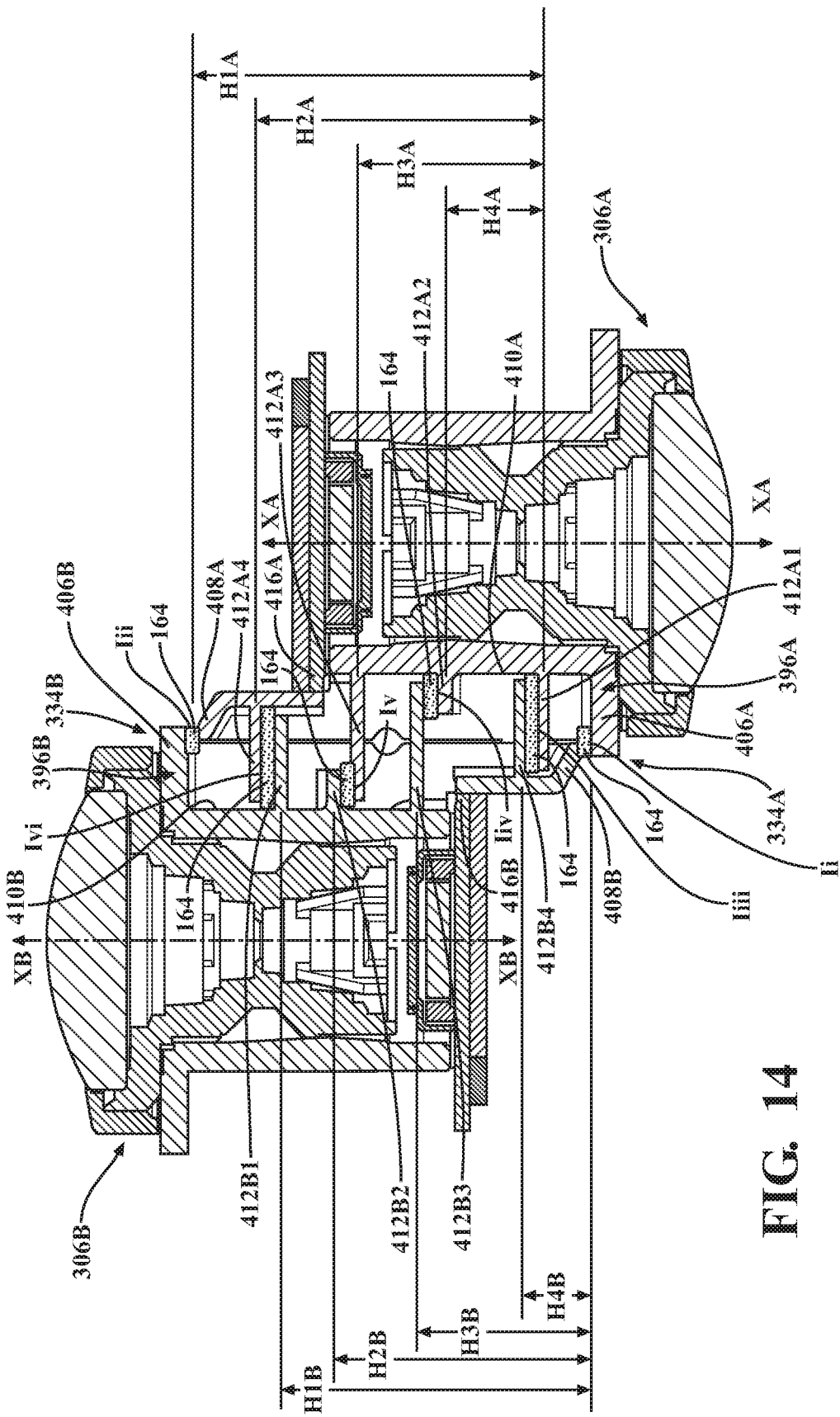
FIG. 14 is a cross-sectional view of the DICD taken through lines 2-2 in FIGS. 1A and 1B illustrating non-identical (first and second) ISLAs according to an alternate embodiment of the disclosure.
Figure 15A:
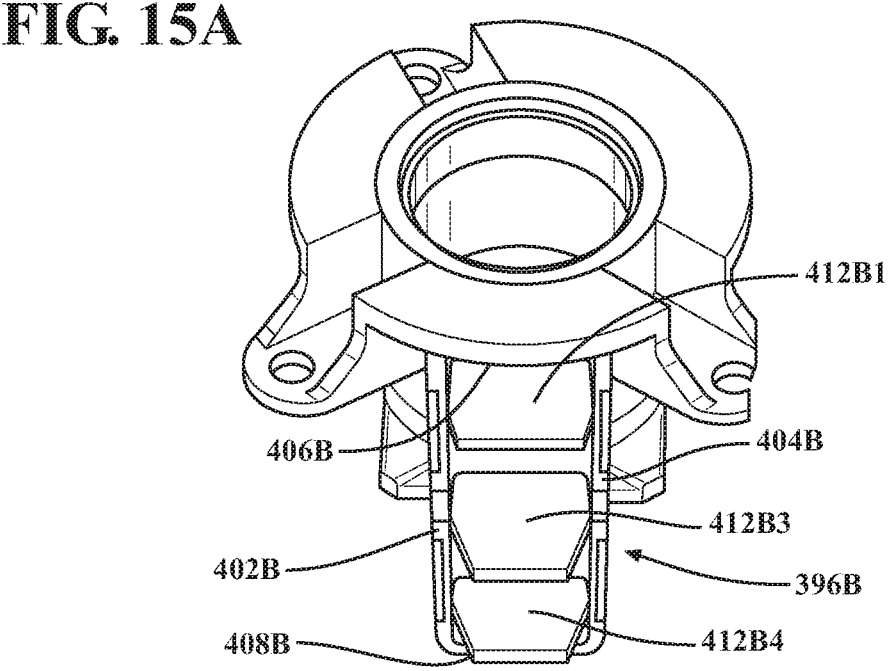
FIG. 15A is a partial, top, perspective view of the first ISLA seen in FIG. 14.
Figure 15B:
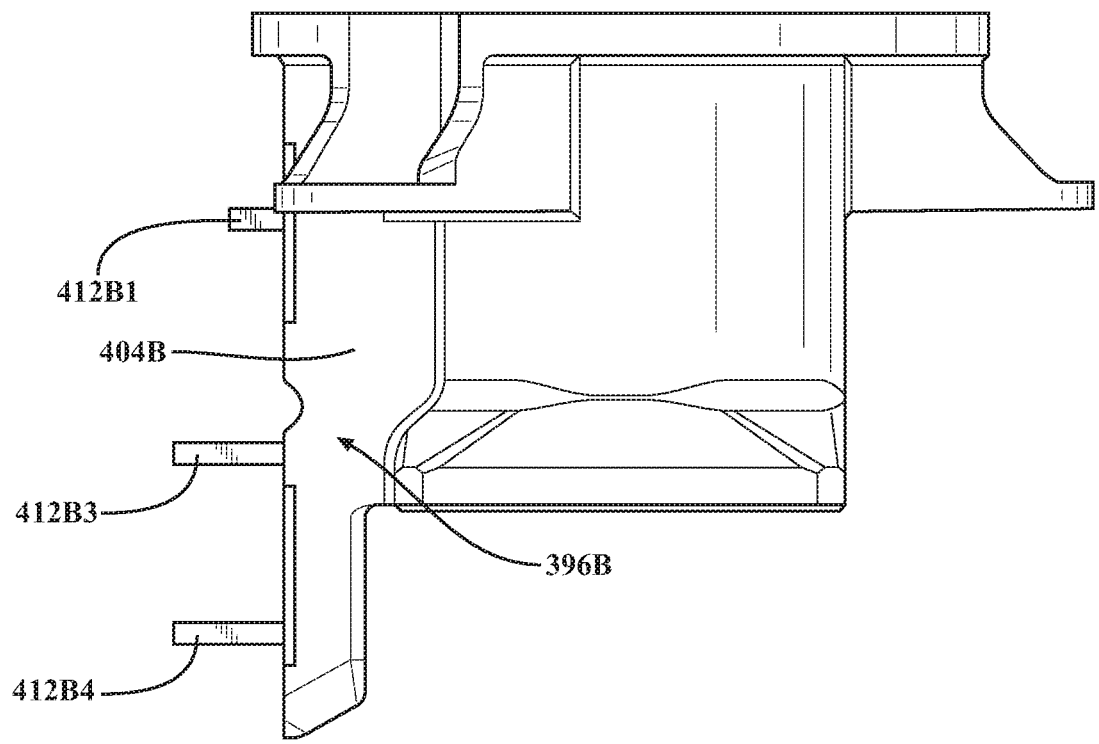
FIG. 15B is a partial, side, plan view of the first ISLA.
Figure 16A:
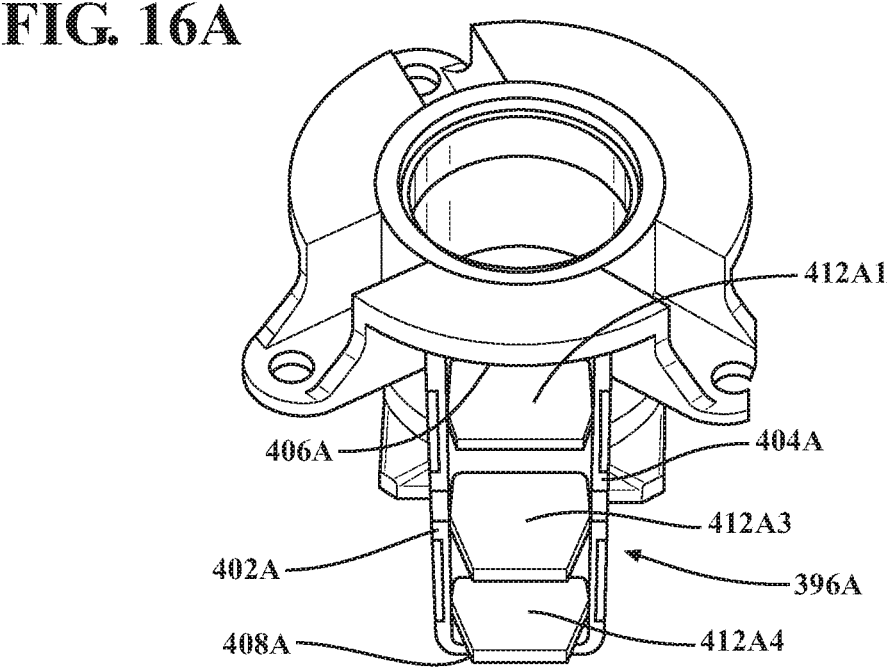
FIG. 16A is a partial, top, perspective view of the second ISLA seen in FIG. 14.
Figure 16B:
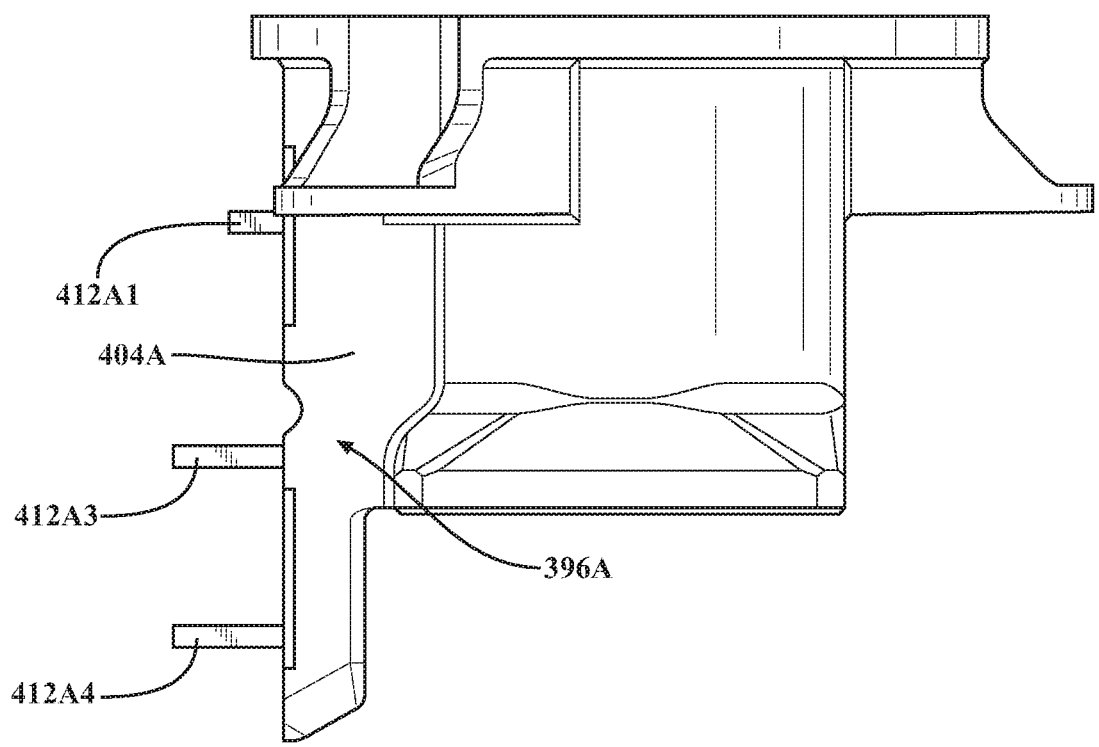
FIG. 16B is a partial, side, plan view of the second ISLA.

More specifically, the cradle 396A includes: a pair of side walls 402A, 404A (FIG. 15A); a pair of end walls 406A, 408A; and a base wall 410A (FIG. 14); and the cradle 396B includes: a pair of side walls 402B, 404B (FIG. 16A); a pair of end walls 406B, 408B; and a base wall 410B (FIG. 14). As seen in FIG. 14, the base walls 410A, 410B include offsets 416A, 416B, respectively, resulting in non-linear, interrupted configurations that accommodate the electronics assemblies 432A, 432B, respectively. In alternate embodiments of the disclosure, however, it is envisioned that the offsets 416A, 416B may be omitted such that the base walls 410A, 410B are linear (and continuous) in configuration.

The cradle 396A further include a series of dividers 412A that are positioned between the end walls 406A, 408A, and the cradle 396B further includes a series of corresponding dividers 412B that are positioned between the end walls 406B, 408B. As seen in FIG. 14, each of the dividers 412A, 412B extends inwardly (i.e., towards the optical axes XB, XA, respectively). In the particular embodiment illustrated in FIGS. 14-16B, the cradle 396A includes a first divider 412A1, a second divider 412A2, a third divider 412A3, and a fourth divider 412A4, and the cradle 396B includes a first divider 412B1, a second divider 412B2, a third divider 412B3, and a fourth divider 412B4. It should be appreciated, however, that the number of dividers 412 included on the ISLAs 306A, 306B may be varied in alternate embodiments of the disclosure.

With particular reference to FIG. 14, the dividers 412A1, 412A2, 412A3, 412A4 are positioned at respective (first, second, third, and fourth) heights H1A, H2A, H3A, H4A (measured from a base/lowest point of the mount 334A), and the dividers 412B1, 412B2, 412B3, 412B4 are positioned at respective (first, second, third, and fourth) heights H1B, H2B, H3B, H4B (measured from a base/lowest point of the mount 334B). To facilitate proper mating engagement of the mounts 334A, 334B, at least one of the dividers 412A is positioned in a different longitudinal (vertical) position than at least one of the corresponding dividers 412B such that at least one of the heights H1A, H2A, H3A, H4A differs from at least one of the heights H1B, H2B, H3B, H4B. The dividers 412A are, thus, at least partially offset from the dividers 412B, which results in the dissimilar configurations of the ISLAs 306A, 306B mentioned above.

With continued reference to FIG. 14, the ISLAs 306A, 306B are oriented such that: the end wall 406A is positioned adjacent the end wall 408B at an interface Ii; the end wall 406B is positioned adjacent the end wall 408A at an interface Iii; the divider 412A1 is positioned adjacent the divider 412B4 at an interface Iiii; the divider 412A2 is positioned adjacent the divider 412B3 at an interface Iiv; the divider 412A3 is positioned adjacent the divider 412B2 at an interface Iv; and the divider 412A4 is positioned adjacent the divider 412B1 at an interface Ivi. To secure the mounts 334A, 334B together, the aforementioned adherent 164 is placed at the interfaces Ii-Ivi for curing using the two-stage (i.e., UV and thermal) processes and procedure discussed above. By providing for a multitude of interfaces I (e.g., via the inclusion of the various dividers 412), the surface area of the mounts 334A, 334B available for contact with the adherent 164 is increased to thereby increase the stability and/or permanence of the connection between the ISLAs 306A, 306B. As discussed above in connection with FIG. 5B (for example), it is envisioned that the adherent 164 may be positioned both internally (i.e., within the mounts 334A, 334B), as well as externally, to further enhance the connection between the ISLAs 306A, 306B.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein are also within the abilities of a person having ordinary skill in the art, and thus, are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationships between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various steps, operations, elements, components, regions, and/or sections, these steps, operations, elements, components, regions, and/or sections should not be limited by the use of these terms in that these terms are used to distinguish one step, operation, element, component, region, or section from another. Thus, unless expressly stated otherwise, a first step, operations, element, component, region, or section could be termed a second step, operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An optical module for a digital image capturing device (DICD), the optical module comprising:
    a first integrated sensor-lens assembly (ISLA) defining a first optical axis, the first ISLA including:
        a first lens;
        a first image sensor fixed in relation to the first lens; and
        a first mount configured to support the first lens and the first image sensor, the first mount including a first exterior receptacle;
    a second ISLA defining a second optical axis offset from the first optical axis, wherein the first ISLA and the second ISLA are identical in configuration and are oriented in generally opposite directions, the second ISLA including:
        a second lens;
        a second image sensor fixed in relation to the second lens; and
        a second mount configured to support the second lens and the second image sensor, the second mount including a second exterior receptacle, wherein the first exterior receptacle and the second exterior receptacle are oriented in facing relation so as to collectively define a cavity; and
    a bridge member configured for receipt within the cavity to thereby fixedly secure together the first and second ISLAs, wherein the bridge member is configured as a discrete structure separate from the first and second ISLAs.

2. The optical module of claim 1, wherein the first ISLA defines a first field-of-view of approximately 180° to approximately 210° and the second ISLA defines a second field-of-view of approximately 180° to approximately 210°, the first ISLA and the second ISLAs positioned such that the first field-of-view and the second field-of-view overlap, whereby images captured by the first ISLA and the second ISLA can be stitched together to form a single image.

3. The optical module of claim 1, wherein the bridge member includes a first bridge portion and a second bridge portion connected to the first bridge portion, wherein the first and second bridge portions are identical in configuration and are oriented in generally opposite directions.

4. The optical module of claim 3, wherein the bridge member defines a first node adjacent to a first end of the bridge member, a second node adjacent to a second opposite end of the bridge member, and a third node positioned between the first and second nodes.

5. The optical module of claim 4, wherein the cavity defined by the first and second exterior receptacles includes a first cavity portion configured to receive the first node of the bridge member, a second cavity portion configured to receive the second node of the bridge member, and a third cavity portion configured to receive the third node of the bridge member.

6. The optical module of claim 5, wherein the first and second exterior receptacles each define a first end chamber, a second end chamber, and an intermediate chamber positioned between the first and second end chambers, the first end chamber of the first exterior receptacle positioned generally opposite the second end chamber of the second exterior receptacle so as to define the first cavity portion, the second end chamber of the first exterior receptacle positioned generally opposite the first end chamber of the second exterior receptacle so as to define the second cavity portion, and the intermediate chamber of the first exterior receptacle positioned generally opposite the intermediate chamber of the second exterior receptacle so as to define the third cavity portion.

7. A digital image capturing device (DICD), comprising:
a first integrated sensor-lens assembly (ISLA) facing in a first direction and defining a first optical axis, wherein the first ISLA includes a first mount having a first body portion;
a second ISLA facing in a second direction generally opposite to the first direction and defining a second optical axis offset from the first optical axis, wherein the second ISLA includes a second mount having a second body portion; and
a bridge member positioned between the first ISLA and the second ISLA to fixedly secure together the first ISLA and the second ISLA, wherein the bridge member is configured as a discrete structure separate from the first body portion and the second body portion, wherein the bridge member defines a longitudinal axis that is generally parallel in relation to the first optical axis and the second optical axis.

8. The DICD of claim 7, wherein the first ISLA and the second ISLA are identical in configuration.

9. The DICD of claim 7, wherein the first ISLA defines a first field-of-view of approximately 180° to approximately 210° and the second ISLA defines a second field-of-view of approximately 180° to approximately 210°, the first ISLA and the second ISLA positioned such that the first field-of-view and the second field-of-view overlap, whereby images captured by the first ISLA and the second ISLA can be stitched together to form a single image.

10. The DICD of claim 7, wherein:
the first ISLA includes:
a first lens; and
a first image sensor fixed in relation to the first lens, wherein the first mount is configured to support the first lens and the first image sensor; and
the second ISLA includes:
a second lens; and
a second image sensor fixed in relation to the second lens, wherein the second mount is configured to support the second lens and the second image sensor.

11. The DICD of claim 10, wherein the first mount defines a first receptacle, and the second mount defines a second receptacle, the first receptacle and the second receptacle each configured to receive the bridge member to thereby connect the first ISLA and the second ISLA.

12. The DICD of claim 11, further including a curable adherent positioned between the bridge member, the first mount, and the second mount to fixedly secure the bridge member to the first mount and the second mount.

13. The DICD of claim 11, wherein the bridge member includes a first bridge portion and a second bridge portion connected to the first bridge portion, wherein the first bridge portion and the second bridge portion are identical in configuration and are oriented in generally opposite directions.

14. The DICD of claim 13, wherein the first bridge portion and the second bridge portion each include:
a first end section;
a second end section opposite to the first end section; and
an intermediate section positioned between the first end section and the second end section, the first end section of the first bridge portion positioned adjacent to the second end section of the second bridge portion so as to define a first node, the second end section of the first bridge portion positioned adjacent to the first end section of the second bridge portion so as to define a second node, and the intermediate section of the first bridge portion positioned adjacent to the intermediate section of the second bridge portion so as to define a third node positioned between the first and second nodes.

15. The DICD of claim 14, wherein the first receptacle and the second receptacle each define:
a first end chamber;
a second end chamber; and
an intermediate chamber positioned between the first end chamber and the second end chamber, the chambers of the first receptacle and the chambers of the second receptacle collectively defining a cavity configured to receive the bridge member.

16. The DICD of claim 15, wherein the first ISLA and the second ISLA are positioned such that the first end chamber of the first receptacle is positioned generally opposite the second end chamber of the second receptacle so as to define a first cavity portion configured to receive the first node of the bridge member, the second end chamber of the first receptacle is positioned generally opposite the first end chamber of the second receptacle so as to define a second cavity portion configured to receive the second node of the bridge member, and the intermediate chamber of the first receptacle is positioned generally opposite the intermediate chamber of the second receptacle so as to define a third cavity portion configured to receive the third node of the bridge member.

17. A method of assembling an optical module for a digital image capturing device (DICD) including first and second identical integrated sensor-lens assemblies (ISLAs), the method comprising:
actively aligning a lens and an image sensor of the first ISLA, wherein the first ISLA includes a first mount having a first body portion;
actively aligning a lens and an image sensor of the second ISLA, wherein the second ISLA includes a second mount having a second body portion;
providing a bridge member configured as a discrete structure separate from the first body portion and the second body portion;
connecting the bridge member to the first ISLA;
connecting the second ISLA to the bridge member such that optical axes defined by the first ISLA and the second ISLA are offset from one another and the first and second ISLAs are oriented in generally opposite directions; and
actively aligning the first ISLA and the second ISLA with respect to one another.

18. The method of claim 17, wherein connecting the bridge member to the first ISLA and connecting the second ISLA to the bridge member includes positioning the bridge member within a first receptacle defined by the first ISLA and within a second receptacle defined by the second ISLA such that the bridge member is positioned within a cavity collectively defined by the first receptacle and the second receptacle.

19. The method of claim 18, wherein positioning the bridge member within the cavity includes:
positioning a first node of the bridge member within a first cavity portion;
positioning a second node of the bridge member within a second cavity portion; and positioning a third node of the bridge member within a third cavity portion.

20. The method of claim 18, wherein connecting the bridge member to the first ISLA and connecting the second ISLA to the bridge member includes curing an adherent positioned between the bridge member, the first receptacle defined by the first ISLA, and the second receptacle defined by the second ISLA.

\* \* \* \* \*